US011525599B2

(12) United States Patent
Kato et al.

(10) Patent No.: US 11,525,599 B2
(45) Date of Patent: Dec. 13, 2022

(54) CONTROLLER OF AIR CONDITIONING APPARATUS, OUTDOOR UNIT, RELAY UNIT, HEAT SOURCE UNIT, AND AIR CONDITIONING APPARATUS

(71) Applicant: Mitsubishi Electric Corporation, Tokyo (JP)

(72) Inventors: Naoki Kato, Tokyo (JP); Yuji Motomura, Tokyo (JP); Naofumi Takenaka, Tokyo (JP); Kimitaka Kadowaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/263,005

(22) PCT Filed: Sep. 28, 2018

(86) PCT No.: PCT/JP2018/036490
§ 371 (c)(1),
(2) Date: Jan. 25, 2021

(87) PCT Pub. No.: WO2020/065984
PCT Pub. Date: Apr. 2, 2020

(65) Prior Publication Data
US 2021/0310688 A1 Oct. 7, 2021

(51) Int. Cl.
*F24F 11/84* (2018.01)
*F24F 11/86* (2018.01)
(Continued)

(52) U.S. Cl.
CPC .............. *F24F 11/84* (2018.01); *F24F 11/86* (2018.01); *F24F 2110/10* (2018.01); *F24F 2110/20* (2018.01)

(58) Field of Classification Search
CPC ........ F24F 11/84; F24F 11/86; F24F 2110/10; F24F 2110/20
See application file for complete search history.

(56) References Cited

U.S. PATENT DOCUMENTS

2011/0185756 A1* 8/2011 Yamashita ............. F25D 21/12 62/171

FOREIGN PATENT DOCUMENTS

JP 2007-163071 A 6/2007
JP 2007163071 A * 6/2007
JP 2009-041860 A 2/2009

OTHER PUBLICATIONS

Tetsuya, Heat pump type cooling/heating system, 2007, Full Document (Year: 2007).*

(Continued)

*Primary Examiner* — Nael N Babaa
(74) *Attorney, Agent, or Firm* — Posz Law Group, PLC

(57) ABSTRACT

When heating is being performed, and a temperature detected by a temperature sensor is lower than a first determination value, a controller opens the flow rate control valve corresponding to a heat exchanger, of the third heat exchangers, to which a request for air conditioning has not been made, and closes the flow rate control valve corresponding to a heat exchanger, of the third heat exchangers, to which the request for air conditioning has been made. When heating is being performed, and the temperature detected by the temperature sensor is higher than a second determination value, the controller opens the flow rate control valve corresponding to the heat exchanger to which the request for air conditioning has been made, and closes the flow rate control valve corresponding to the heat exchanger to which the request for air conditioning has not been made.

9 Claims, 19 Drawing Sheets

(51) Int. Cl.
*F24F 110/10* (2018.01)
*F24F 110/20* (2018.01)

(56) References Cited

OTHER PUBLICATIONS

International Search Report of the International Searching Authority dated Nov. 6, 2018 for the corresponding International application No. PCT/JP2018/036490 (and English translation).

* cited by examiner

<DURING HEATING (T1 ≥ X°C)>

<DURING HEATING (T1 <X°C: STATE A)>

<DURING HEATING (T1<X°C: STATE B)>

<DURING HEATING (T1<X°C: STATE C)>

<DURING HEATING (T1 ≥ X°C: STATE D)>

<DURING HEATING (T1 ≥ X°C: STATE E)>

CONTROLLER OF AIR CONDITIONING APPARATUS, OUTDOOR UNIT, RELAY UNIT, HEAT SOURCE UNIT, AND AIR CONDITIONING APPARATUS

CROSS REFERENCE TO RELATED APPLICATION

This application is a U.S. national stage application of PCT/JP2018/036490 filed on Sep. 28, 2018, the contents of which are incorporated herein by reference.

TECHNICAL FIELD

The present disclosure relates to a controller of an air conditioning apparatus, an outdoor unit, a relay unit, a heat source unit, and an air conditioning apparatus.

BACKGROUND ART

Conventionally, an indirect air conditioning apparatus is known that generates hot and/or cold water by a heat source unit such as a heat pump, and delivers the water to an indoor unit through a water pump and a pipe to perform heating and/or cooling in the interior of a room. Such an air conditioning apparatus includes: a heat source unit for cooling or heating hot and/or cold water; an air conditioner for supplying to a use side the air that has exchanged heat with the hot and/or cold water delivered from the heat source unit; a flow rate control valve provided in the air conditioner; and a water pump for circulating the hot and/or cold water.

Such an indirect air conditioning apparatus employs water or brine as hot and/or cold water serving as a use-side heat medium, and thus has been receiving increasing attention in recent years in order to reduce refrigerant usage.

An example of such an indirect air conditioning apparatus is disclosed in Japanese Patent Laying-Open No. 2009-41860.

CITATION LIST

Patent Literature

PTL 1: Japanese Patent Laying-Open No. 2009-41860

SUMMARY OF INVENTION

Technical Problem

In the indirect air conditioning apparatus such as in Japanese Patent Laying-Open No. 2009-41860, at the start of heating, the temperature of refrigerant in the heat source unit and the temperature of water or brine in a water circuit may be lower than room temperature. In such a case, it takes time for the water or brine in the water circuit to have a high temperature, and cold air is blown from an indoor air conditioner without temperature increase in the water or brine. This may cause a reduction in room temperature during the heating, resulting in compromised comfort. It may be possible to stop the water pump when the water or brine has a temperature lower than the room temperature. To avoid freezing of the water and variation in water temperature in the water circuit, however, the water pump cannot be stopped.

The present disclosure has been made to solve the problem described above, and has an object to provide a controller, of an indirect air conditioning apparatus using a heat medium such as water or brine, which is capable of preventing generation of cold air from an indoor unit at the start of heating while preventing freezing of the heat medium, to avoid a reduction in room temperature.

Solution to Problem

The present disclosure relates to a controller to control an air conditioning apparatus. The air conditioning apparatus includes: a compressor configured to compress a first heat medium; a first heat exchanger configured to exchange heat between the first heat medium and outdoor air; a second heat exchanger configured to exchange heat between the first heat medium and a second heat medium; a plurality of third heat exchangers each configured to exchange heat between the second heat medium and indoor air; a plurality of flow rate control valves each configured to control a flow rate of the second heat medium flowing through a corresponding one of the plurality of third heat exchangers; a pump configured to circulate the second heat medium between the plurality of third heat exchangers and the second heat exchanger; and a first temperature sensor configured to detect a temperature of the second heat medium. When the air conditioning apparatus is operating in a heating mode, and (i) when the temperature detected by the first temperature sensor is lower than a first determination value, the controller is configured to open the flow rate control valve corresponding to a heat exchanger, of the plurality of third heat exchangers, to which a request for air conditioning has not been made, and to close the flow rate control valve corresponding to a heat exchanger, of the plurality of third heat exchangers, to which the request for air conditioning has been made, and (ii) when the temperature detected by the first temperature sensor is higher than a second determination value higher than or equal to the first determination value, the controller is configured to open the flow rate control valve corresponding to the heat exchanger, of the plurality of third heat exchangers, to which the request for air conditioning has been made, and to close the flow rate control valve corresponding to the heat exchanger, of the plurality of third heat exchangers, to which the request for air conditioning has not been made.

Advantageous Effects of Invention

According to the controller of the present disclosure, a reduction in room temperature is avoided at the start of heating by an air conditioning apparatus, and accordingly, comfort during air conditioning is improved.

DESCRIPTION OF EMBODIMENTS

Figure 1:
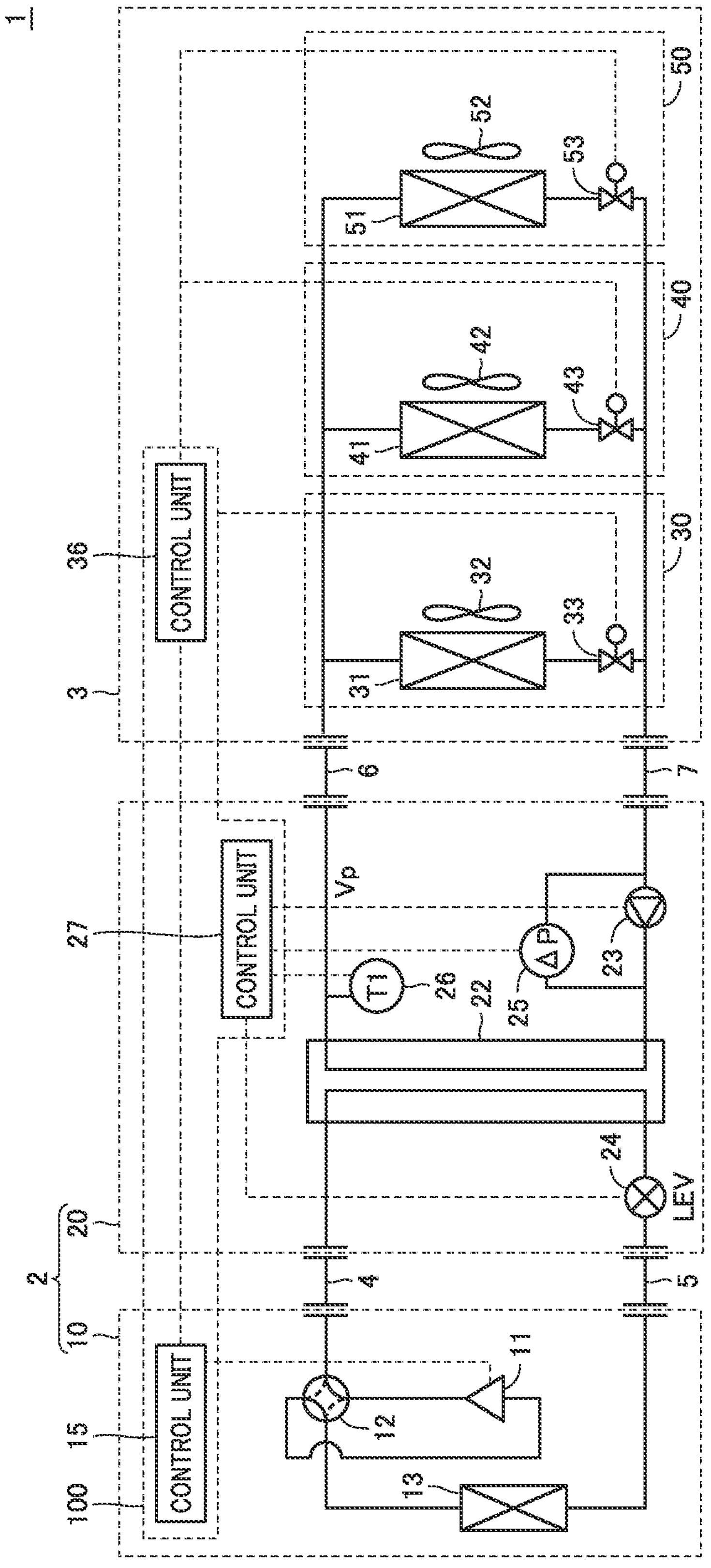
FIG. 1 shows the configuration of an air conditioning apparatus according to a first embodiment.

In the following, embodiments of the present disclosure will be described in detail with reference to the drawings. While a plurality of embodiments are described below, it has been intended from the time of filing of the present application to appropriately combine configurations described in the respective embodiments. Note that the same or corresponding parts are designated by the same symbols in the drawings and will not be described repeatedly.

First Embodiment

FIG. 1 shows the configuration of an air conditioning apparatus according to a first embodiment. Referring to FIG. 1, an air conditioning apparatus 1 includes a heat source unit 2, an indoor air conditioning device 3, and a controller 100. Heat source unit 2 includes an outdoor unit 10 and a relay unit 20. In the following description, a first heat medium can be exemplified by refrigerant, and a second heat medium can be exemplified by water or brine.

Outdoor unit 10 includes part of a refrigeration cycle that operates as a heat source or a cold source for the first heat medium. Outdoor unit 10 includes a compressor 11, a four-way valve 12, and a first heat exchanger 13. FIG. 1 shows an example where four-way valve 12 performs heating, with heat source unit 2 serving as a heat source. When four-way valve 12 is switched to reverse the direction of circulation of the refrigerant, cooling is performed, with heat source unit 2 serving as a cold source.

Relay unit 20 includes a second heat exchanger 22, a pump 23 for circulating the second heat medium between the second heat exchanger and indoor air conditioning device 3, an expansion valve 24, a pressure sensor 25 for detecting a differential pressure ΔP before and after pump 23, and a temperature sensor 26 for measuring a temperature T1 of the second heat medium that has passed through second heat exchanger 22. Second heat exchanger 22 exchanges heat between the first heat medium and the second heat medium. For example, a plate heat exchanger can be used as second heat exchanger 22.

Outdoor unit 10 and relay unit 20 are connected to each other by pipes 4 and 5 for flowing the first heat medium. Compressor 11, four-way valve 12, first heat exchanger 13, expansion valve 24, and second heat exchanger 22 form a first heat medium circuit which is a refrigeration cycle using the first heat medium. Note that outdoor unit 10 and relay unit 20 may be integrated together in heat source unit 2. If they are integrated together, pipes 4 and 5 are accommodated in a casing.

Indoor air conditioning device 3 and relay unit 20 are connected to each other by extension pipes 6 and 7 for flowing the second heat medium. Indoor air conditioning device 3 includes an indoor unit 30, an indoor unit 40 and an indoor unit 50. Indoor units 30, 40 and 50 are connected in parallel with one another between extension pipe 6 and extension pipe 7. A plurality of third heat exchangers 31, 41 and 51 are disposed in indoor units 30, 40 and 50, respectively.

Indoor unit 30 includes third heat exchanger 31, a fan 32 for delivering indoor air to third heat exchanger 31, and a flow rate control valve 33 for controlling a flow rate of the second heat medium. Third heat exchanger 31 exchanges heat between the second heat medium and the indoor air.

Indoor unit 40 includes third heat exchanger 41, a fan 42 for delivering indoor air to third heat exchanger 41, and a flow rate control valve 43 for controlling a flow rate of the second heat medium. Third heat exchanger 41 exchanges heat between the second heat medium and the indoor air.

Indoor unit 50 includes third heat exchanger 51, a fan 52 for delivering indoor air to third heat exchanger 51, and a flow rate control valve 53 for controlling a flow rate of the second heat medium. Third heat exchanger 51 exchanges heat between the second heat medium and the indoor air.

Note that pump 23, second heat exchanger 22, and parallel-connected third heat exchangers 31, 41, 51 form a second heat medium circuit using the second heat medium. While an air conditioning apparatus having three indoor units is illustrated by way of example in the present embodiment, any number of indoor units may be provided.

As with third heat exchangers 31, 41 and 51, first heat exchanger 13 may be provided with a not-shown fan for changing the amount of heat exchange with outdoor air.

Control units 15, 27 and 36 distributed across outdoor unit 10, relay unit 20 and indoor air conditioning device 3 cooperate with one another to operate as controller 100. Controller 100 controls compressor 11, expansion valve 24, pump 23, flow rate control valves 33, 43, 53, and fans 32, 42, 52 in response to outputs from pressure sensor 25 and temperature sensor 26.

Note that one of control units 15, 27 and 36 may serve as a controller, and control compressor 11, expansion valve 24, pump 23, flow rate control valves 33, 43, 53, and fans 32, 42, 52 based on data detected by the others of control units 15, 27 and 36. If heat source unit 2 has outdoor unit 10 and relay unit 20 that are integrated together, control units 15 and 27 may cooperate with each other to operate as a controller based on data detected by control unit 36.

In the configuration of FIG. 1, when air conditioning apparatus 1 is operating in a heating mode, and the temperature detected by temperature sensor 26 is lower than a first determination value (for example, 25° C.), controller 100 opens the flow rate control valve corresponding to a heat exchanger, of the plurality of third heat exchangers 31, 41 and 51, to which a request for air conditioning has not been made, and closes the flow rate control valve corresponding to a heat exchanger, of the plurality of third heat exchangers 31, 41 and 51, to which the request for air conditioning has been made. Note that flow rate control valves 33, 43 and 53 correspond to third heat exchangers 31, 41 and 51, respectively.

Then, when air conditioning apparatus 1 is operating in the heating mode, and the temperature detected by temperature sensor 26 is higher than a second determination value (for example, 25° C.) higher than or equal to the first determination value, controller 100 opens the flow rate control valve corresponding to the heat exchanger, of the plurality of third heat exchangers 31, 41 and 51, to which the request for air conditioning has been made, and closes the flow rate control valve corresponding to the heat exchanger, of the plurality of third heat exchangers 31, 41 and 51, to which the request for air conditioning has not been made.

With such control of each flow rate control valve by controller 100, the generation of cold air from the indoor unit into a room for which the request for air conditioning has been made is suppressed at the start of heating. This operation will be sequentially described below.

Figure 2:
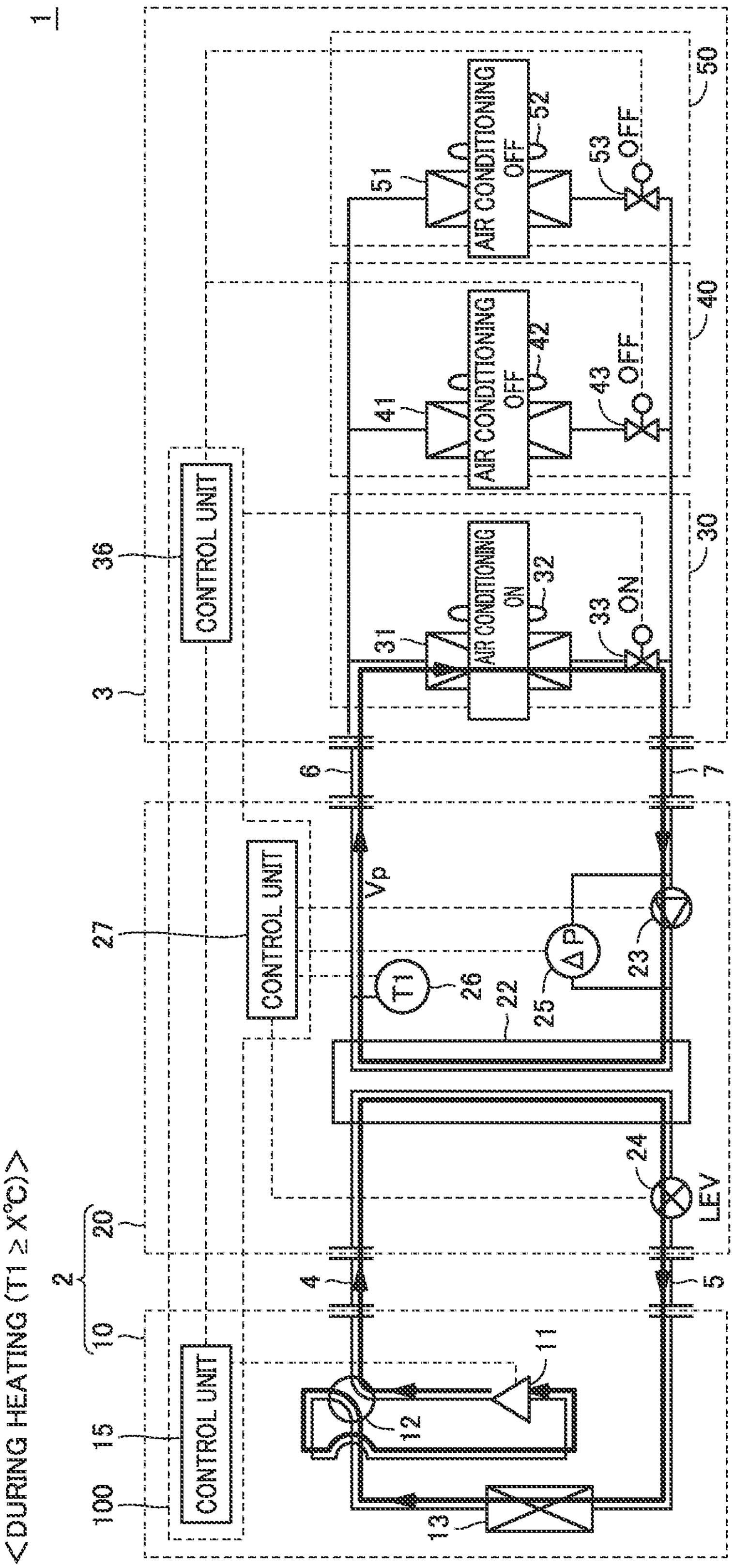
FIG. 2 shows flows of a first heat medium and a second heat medium when a temperature T1 is higher than or equal to a determination value X° C. during heating operation.

For ease of explanation, an example where indoor units 40 and 50 are in a stopped state and only indoor unit 30 is performing heating operation is initially described. FIG. 2 shows flows of the first heat medium and the second heat medium when temperature T1 is higher than or equal to a determination value X° C. during heating operation. In FIG. 2, indoor unit 30 is described as being in an air-conditioning ON state, and indoor units 40 and 50 are described as being in an air-conditioning OFF state. Note that the air-conditioning ON state indicates that a request for air conditioning has been made to the indoor unit, and the air-conditioning OFF state indicates that the request for air conditioning has not been made to the indoor unit. The air-conditioning OFF state includes a situation where the indoor unit has been turned off by a remote controller or the like, and also a situation where room temperature has reached a set temperature because air conditioning was performed by the indoor unit in the air-conditioning ON state, and the air conditioning is being suspended.

During the heating operation, four-way valve 12 is set such that the first heat medium, which is refrigerant of the refrigeration cycle, is discharged from compressor 11, passes successively through second heat exchanger 22, expansion valve 24 and first heat exchanger 13, and returns to compressor 11. The high-temperature and high-pressure first heat medium discharged from compressor 11 exchanges heat with the second heat medium at second heat exchanger 22 and is thereby condensed. The condensed first heat medium is decompressed by expansion valve 24, evaporates into a low-temperature gaseous state at first heat exchanger 13, and returns to compressor 11.

In the second heat medium circuit, the second heat medium, which is water or brine delivered from pump 23, exchanges heat with the first heat medium at second heat exchanger 22 and thereby increases in temperature. The second heat medium having the increased temperature is supplied to indoor unit 30 in the air-conditioning ON state, and exchanges heat with the indoor air. Indoor unit 30 in the air-conditioning ON state thereby supplies hot air into the room. Note that flow rate control valve 33 corresponding to indoor unit 30 in the air-conditioning ON state is controlled to be in an open state, and flow rate control valves 43 and 53 corresponding to indoor units 40 and 50 in the air-conditioning OFF state are controlled to be in a closed state. Thus, the second heat medium flows through third heat exchanger 31, but does not flow through third heat exchangers 41 and 51.

Figure 3:
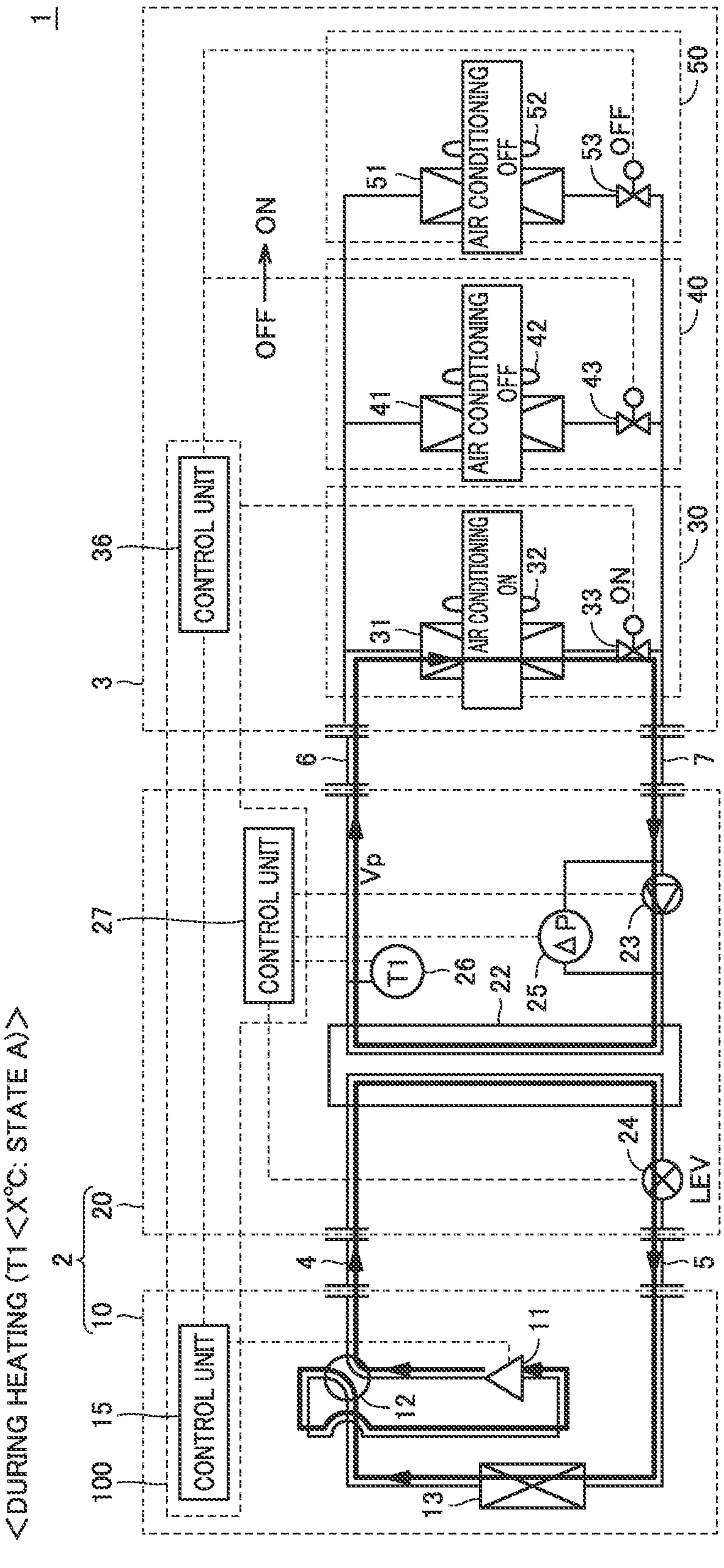
FIG. 3 shows flows of the first heat medium and the second heat medium and control of flow rate control valves when temperature T1 is lower than determination value X° C. (state A) during heating.

FIG. 3 shows flows of the first heat medium and the second heat medium and control of the flow rate control valves when temperature T1 is lower than determination value X° C. (state A) during heating. State A is a state that occurs, for example, at the start of heating, or upon return to heating operation after heating-defrosting operation. FIG. 3 shows that the first heat medium and the second heat medium circulate in a manner similar to FIG. 2. In this state, when temperature T1 detected by temperature sensor 26 is lower than the first determination value, controller 100 initially switches flow rate control valve 43 from an OFF state to an ON state.

Figure 4:
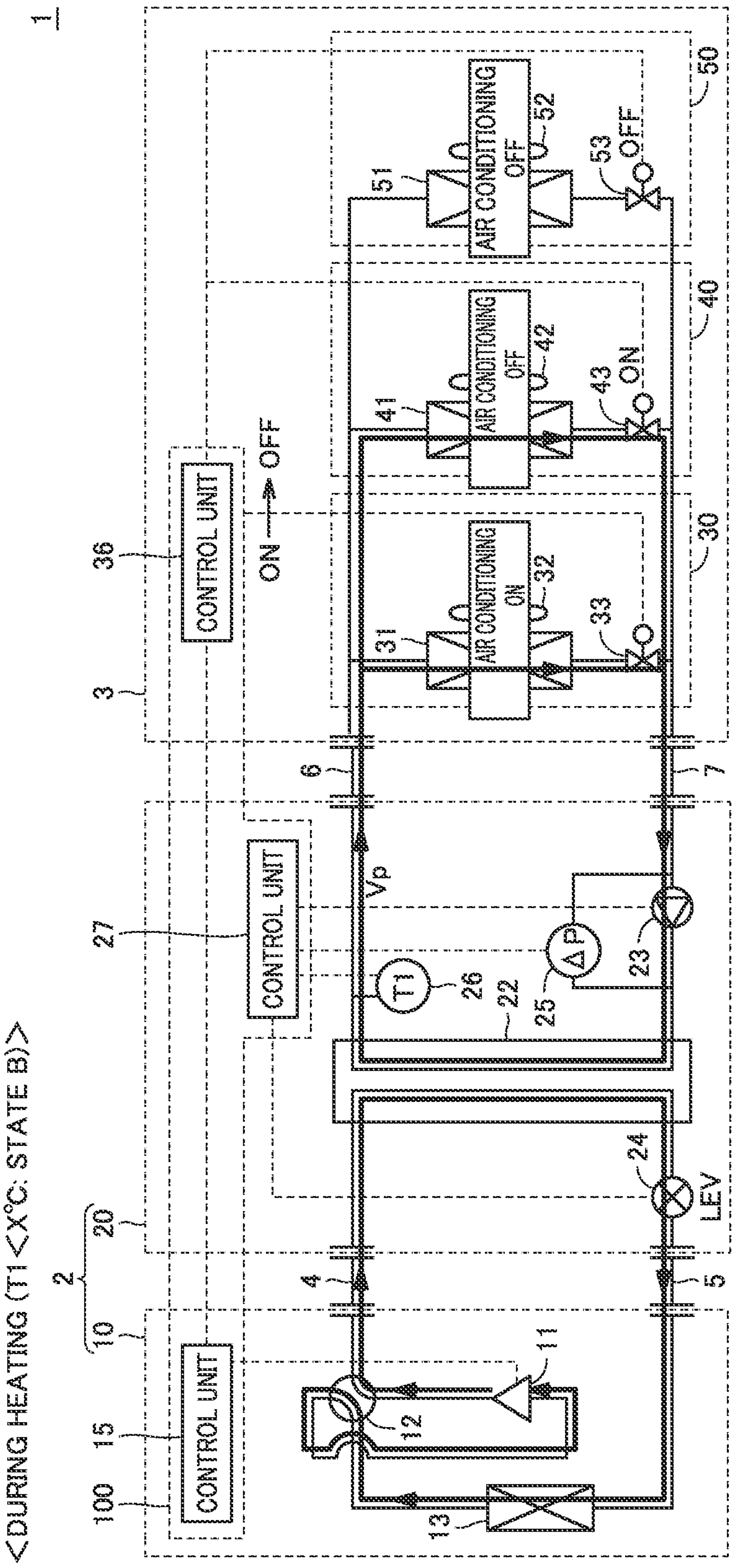
FIG. 4 shows flows of the first heat medium and the second heat medium and control of the flow rate control valves when temperature T1 is lower than determination value X° C. (state B) during heating.

FIG. 4 shows flows of the first heat medium and the second heat medium and control of the flow rate control valves when temperature T1 is lower than determination value X° C. (state B) during heating. State B is a state immediately after the control of flow rate control valve 43 in state A has been changed by controller 100. In state B, the first heat medium flows in the same manner as FIGS. 2 and 3. In state B, on the other hand, the second heat medium flows through third heat exchanger 31 and third heat exchanger 41 in parallel, which is different from FIGS. 2 and 3. In this state B, controller 100 switches flow rate control valve 33 from the ON state to the OFF state.

Figure 5:
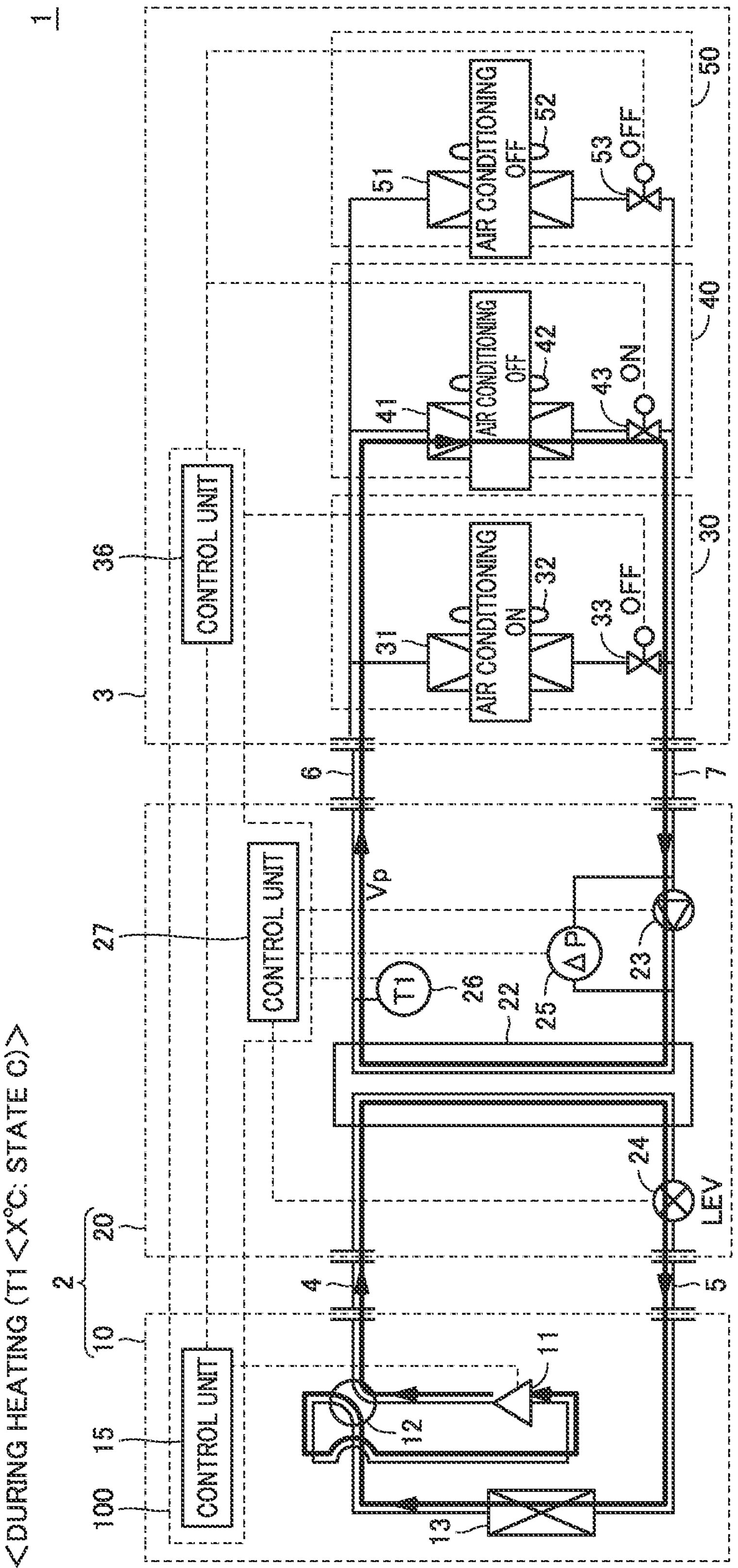
FIG. 5 shows flows of the first heat medium and the second heat medium and control of the flow rate control valves when temperature T1 is lower than determination value X° C. (state C) during heating.

FIG. 5 shows flows of the first heat medium and the second heat medium and control of the flow rate control valves when temperature T1 is lower than determination value X° C. (state C) during heating. State C is a state immediately after the control of flow rate control valve 33 has been changed, in addition to the control of flow rate control valve 43, by controller 100. In state C, the first heat medium flows in the same manner as FIGS. 2 to 4. In state C, on the other hand, the second heat medium flows through third heat exchanger 41 without flowing through third heat exchanger 31, which is different from FIGS. 2 and 3. In this state C, controller 100 continues operating until temperature T1 of the first heat medium becomes higher than determination value X° C. In this state C, the low-temperature first heat medium flows through third heat exchanger 41. However, since indoor unit 40 is in the air-conditioning OFF state where the request for air conditioning has not been made, it is unlikely that cold air will cause discomfort for a user.

Figure 6:
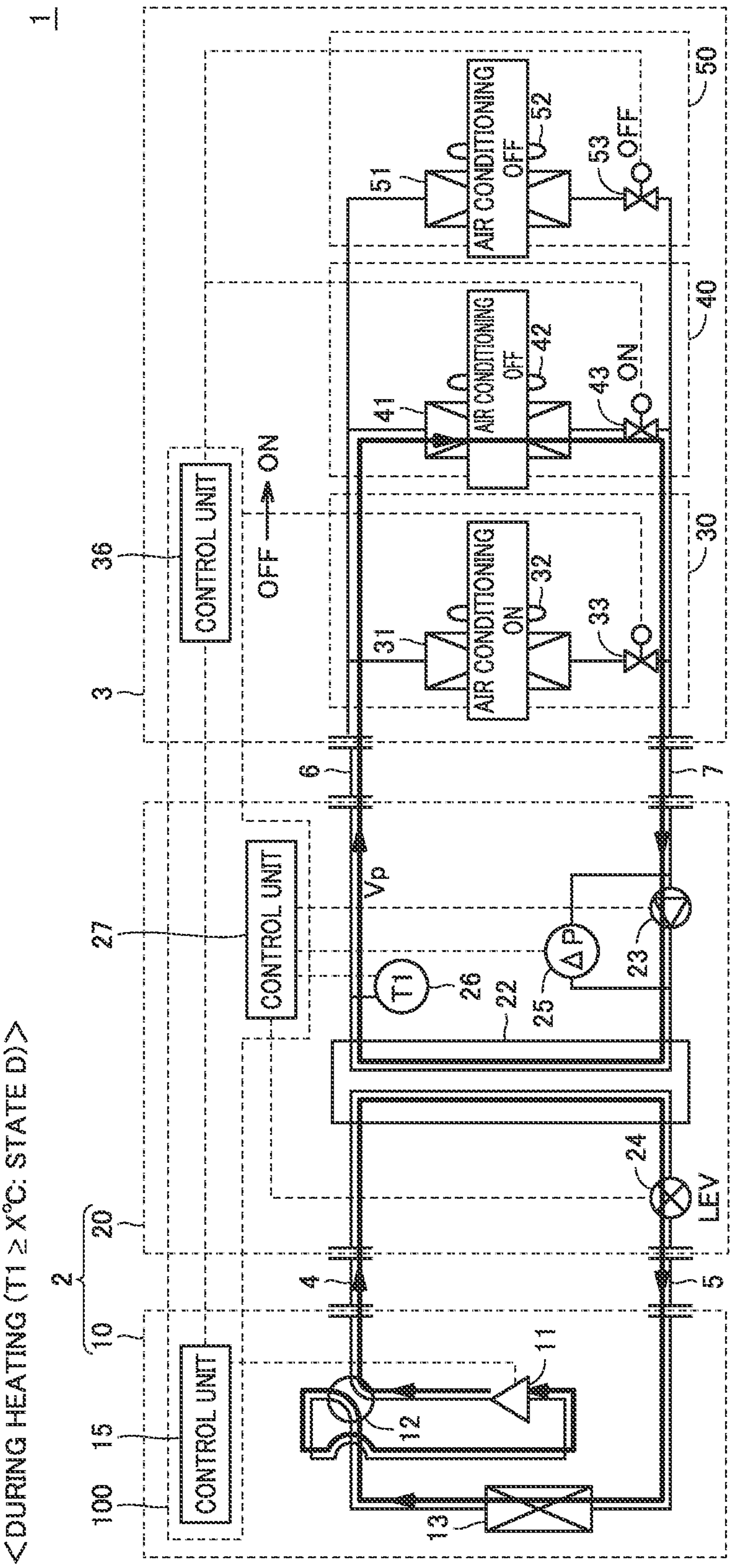
FIG. 6 shows flows of the first heat medium and the second heat medium and control of the flow rate control valves when temperature T1 changes from a temperature lower than determination value X° C. to a temperature higher than or equal to determination value X° C. (state D) during heating.

FIG. 6 shows flows of the first heat medium and the second heat medium and control of the flow rate control valves when temperature T1 changes from a temperature lower than determination value X° C. to a temperature higher than or equal to determination value X° C. (state D) during heating. In state D, the first heat medium and the second heat medium flow in the same manner as FIG. 5. In this state, controller 100 switches flow rate control valve 33 from the OFF state to the ON state.

Figure 7:
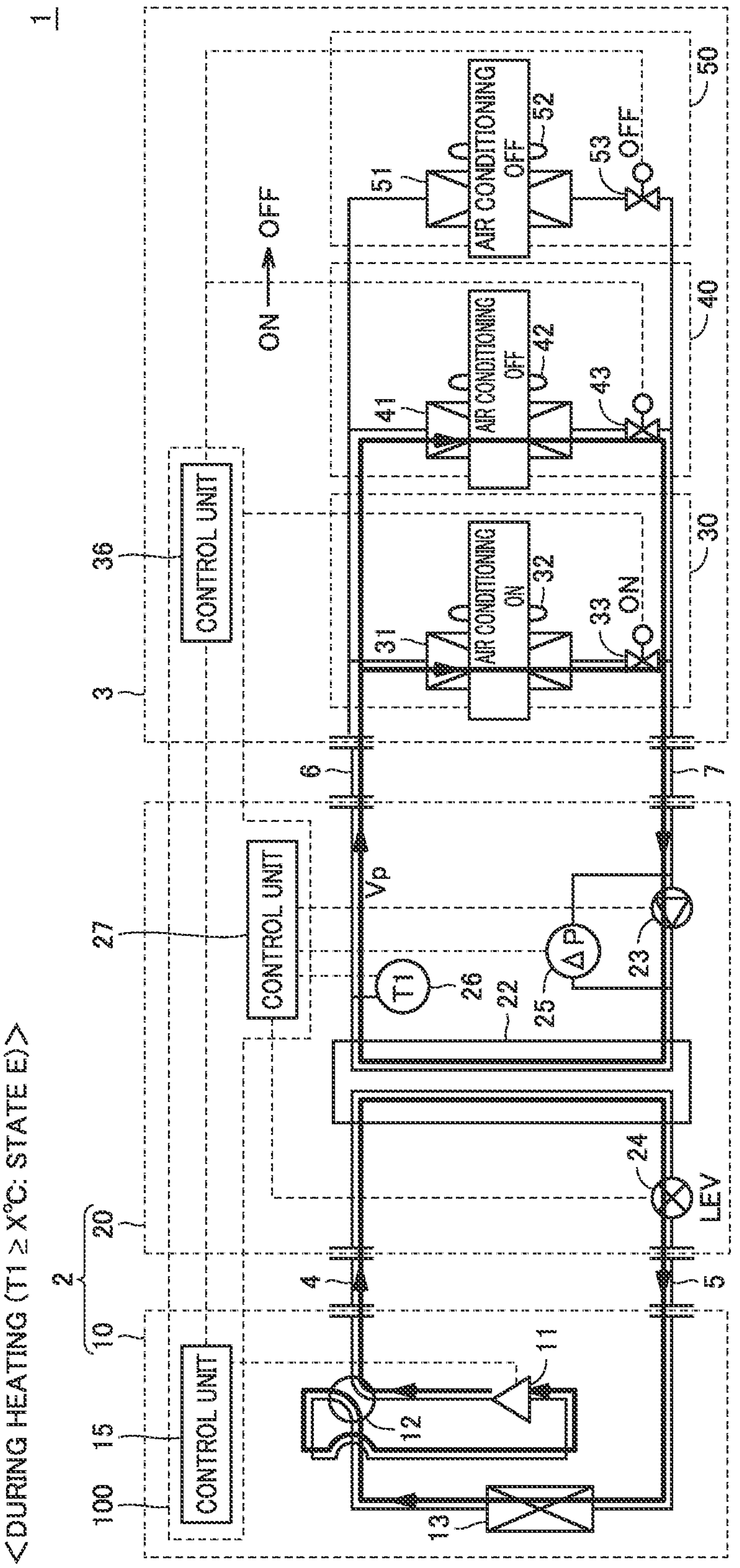
FIG. 7 shows flows of the first heat medium and the second heat medium and control of the flow rate control valves when temperature T1 changes from a temperature lower than determination value X° C. to a temperature higher than or equal to determination value X° C. (state E) during heating.

FIG. 7 shows flows of the first heat medium and the second heat medium and control of the flow rate control valves when temperature T1 changes from a temperature lower than determination value X° C. to a temperature higher than or equal to determination value X° C. (state E) during heating. State E is a state immediately after the control of flow rate control valve 33 in state D has been changed by controller 100. In state E, the first heat medium and the second heat medium flow in the same manner as FIG. 4. In this state, controller 100 switches flow rate control valve 43 from the ON state to the OFF state. As a result, the first heat medium and the second heat medium flow as shown in FIG. 2, causing indoor unit 30 in the air-conditioning ON state to supply hot air into the room.

As described above, when temperature T1 is lower than determination value X° C., the flow rate control valve corresponding to the indoor unit in the air-conditioning ON state is closed, and the flow rate control valve corresponding to the indoor unit in the air-conditioning OFF state is opened, and when temperature T1 is higher than or equal to determination value X° C., the flow rate control valve corresponding to the indoor unit in the air-conditioning ON state is opened, and the flow rate control valve corresponding to the indoor unit in the air-conditioning OFF state is closed. As a result, the low-temperature first heat medium circulates through the indoor unit in the air-conditioning OFF state until the temperature of the first heat medium increases sufficiently. Thus, the low-temperature first heat medium is not introduced into the indoor unit to which the request for air conditioning has been made, and accordingly, the generation of cold air is suppressed.

In FIGS. 2 to 7, determination value X° C. used to switch the flow path from the indoor unit in the air-conditioning ON state to the indoor unit in the air-conditioning OFF state is also employed as the determination value used to return the flow path from the indoor unit in the air-conditioning OFF state to the indoor unit in the air-conditioning ON state. Alternatively, these two determination values may be different values. When the determination value used to switch the flow path from the indoor unit in the air-conditioning ON state to the indoor unit in the air-conditioning OFF state is X1, and the determination value used to return the flow path from the indoor unit in the air-conditioning OFF state to the indoor unit in the air-conditioning ON state is X2, setting of X2>X1 can avoid frequent switching of the flow path upon variation or change in the temperature of the first heat medium.

Figure 8:
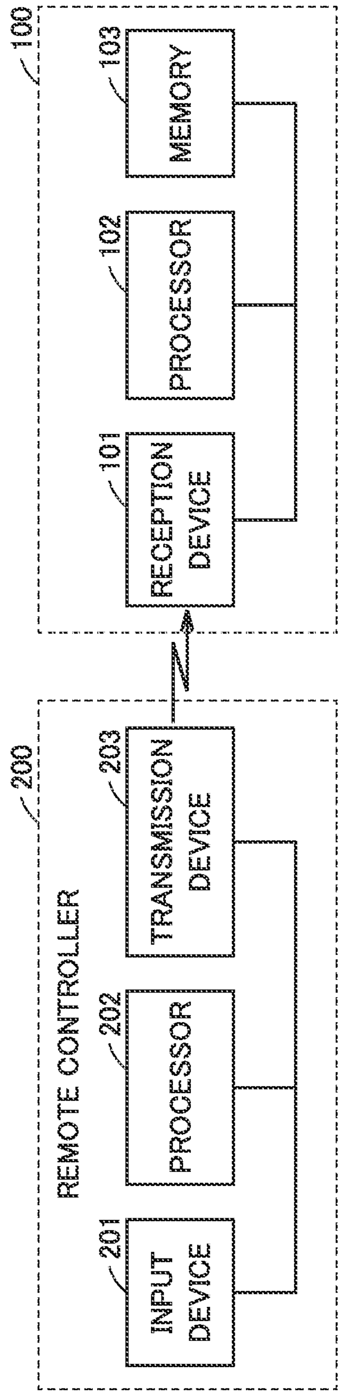
FIG. 8 shows the configuration of a controller for controlling the air conditioning apparatus and of a remote controller for remotely controlling the controller.

FIG. 8 shows the configuration of the controller for controlling the air conditioning apparatus and of a remote controller for remotely controlling the controller. Referring to FIG. 8, a remote controller 200 includes an input device 201, a processor 202, and a transmission device 203. Input device 201 includes a push button to switch between ON/OFF of the indoor unit by the user, a button to enter a set temperature, and the like. Transmission device 203 is for communicating with controller 100. Processor 202 controls transmission device 203 in accordance with an input signal provided from input device 201.

Controller 100 includes a reception device 101, a processor 102, and a memory 103.

Memory 103 includes, for example, a read only memory (ROM), a random access memory (RAM), and a flash memory. Note that the flash memory stores an operating system, an application program, and various types of data.

Processor 102 controls overall operation of air conditioning apparatus 1. Controller 100 shown in FIG. 1 is implemented by processor 102 executing the operating system and the application program stored in memory 103. The various types of data stored in memory 103 are referred to during the execution of the application program. Reception device 101 is for communicating with remote controller 200. When there are a plurality of indoor units, reception device 101 is provided in each of the plurality of indoor units.

When the controller is divided into a plurality of control units as shown in FIG. 1, the processor is included in each of the plurality of control units. In such a case, the plurality of processors cooperate with one another to perform overall control of air conditioning apparatus 1.

Figure 9:
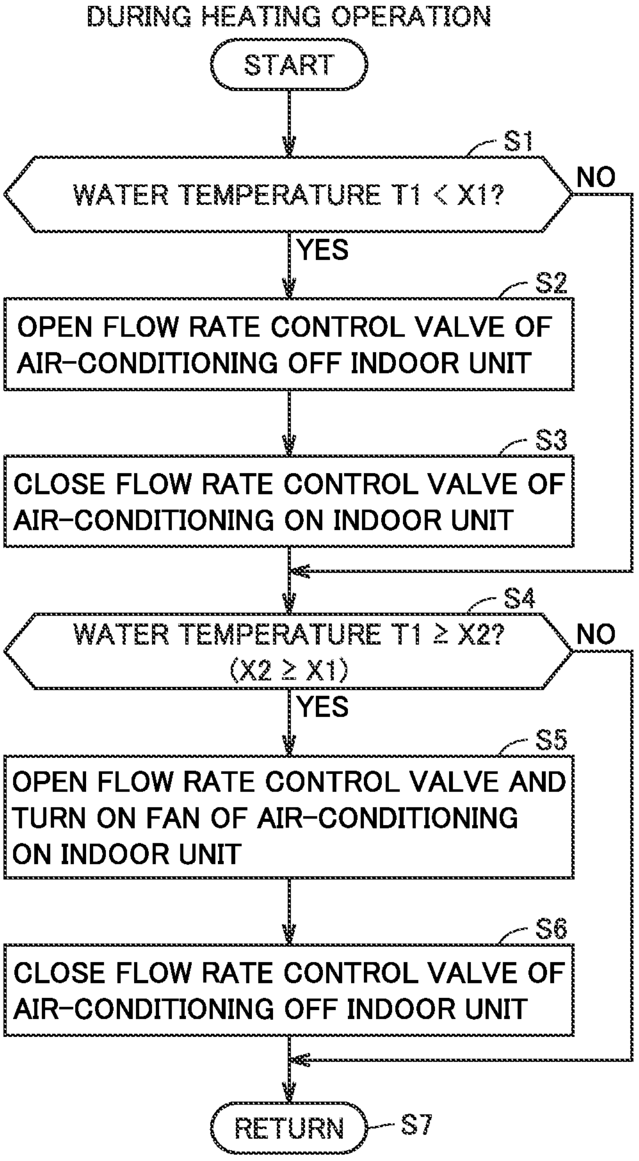
FIG. 9 is a flowchart for illustrating control performed by the controller during heating operation in the first embodiment.

FIG. 9 is a flowchart for illustrating control performed by the controller during heating operation in the first embodiment. Processing of the flowchart in FIG. 9 is invoked from a main routine of heating operation control and repeatedly executed in order to control the flow rate control valves during the heating operation. The operating frequency of compressor 11, the switching of four-way valve 12, the fans and the like are controlled in the main routine of heating operation control. As in FIG. 9 and the like, temperature T1 of the second heat medium detected by temperature sensor 26 is referred to as water temperature T1 for brevity of description.

Referring to FIG. 9, in step S1, controller 100 determines whether or not water temperature T1 is lower than determination value X1. When water temperature T1 is lower than determination value X1 (YES in S1), controller 100 performs processing of steps S2 and S3, and then moves the processing to step S4. When water temperature T1 is higher than or equal to determination value X1 (NO in S1), on the other hand, controller 100 moves the processing to step S4 without performing the processing of steps S2 and S3.

In step S2, controller 100 opens the flow rate control valve of an indoor unit in the air-conditioning OFF state. As a result, the flow of the second heat medium through air conditioning apparatus 1 is changed from that shown in FIG. 3 to that shown in FIG. 4.

In subsequent step S3, controller 100 closes the flow rate control valve of an indoor unit in the air-conditioning ON state. As a result, the flow of the second heat medium through air conditioning apparatus 1 is changed from that shown in FIG. 4 to that shown in FIG. 5. Air conditioning apparatus 1 is then operated in this state, and accordingly, the temperature of the second heat medium increases while the generation of cold air in the indoor unit in the air-conditioning ON state is suppressed.

In subsequent step S4, controller 100 determines whether or not water temperature T1 is higher than or equal to a determination value X2. This determination value X2 may be the same as determination value X1, but is desirably higher than determination value X1 in order to avoid frequent switching of the control of the flow rate control valves.

When water temperature T1 is higher than or equal to determination value X2 (YES in S4), controller 100 performs processing of steps S5 and S6, and then moves the processing to step S7. When water temperature T1 is lower than determination value X2 (NO in S4), on the other hand, controller 100 moves the processing to step S7 without performing the processing of steps S5 and S6.

In step S5, controller 100 opens the flow rate control valve and turns on the fan in the indoor unit in the air-conditioning ON state. As a result, hot air is supplied into the room from the indoor unit to which the request for air conditioning has been made. The flow of the second heat medium through air conditioning apparatus 1 is changed from that shown in FIG. 5 to that shown in FIG. 7.

In subsequent step S6, controller 100 closes the flow rate control valve of the indoor unit in the air-conditioning OFF state. As a result, the flow of the second heat medium through air conditioning apparatus 1 is changed from that shown in FIG. 7 to that shown in FIG. 2. Air conditioning apparatus 1 is then operated in this state, and accordingly, heating by the indoor unit in the air-conditioning ON state is continued. Then, in step S7, the control is returned to the main routine of heating operation.

Figure 10:
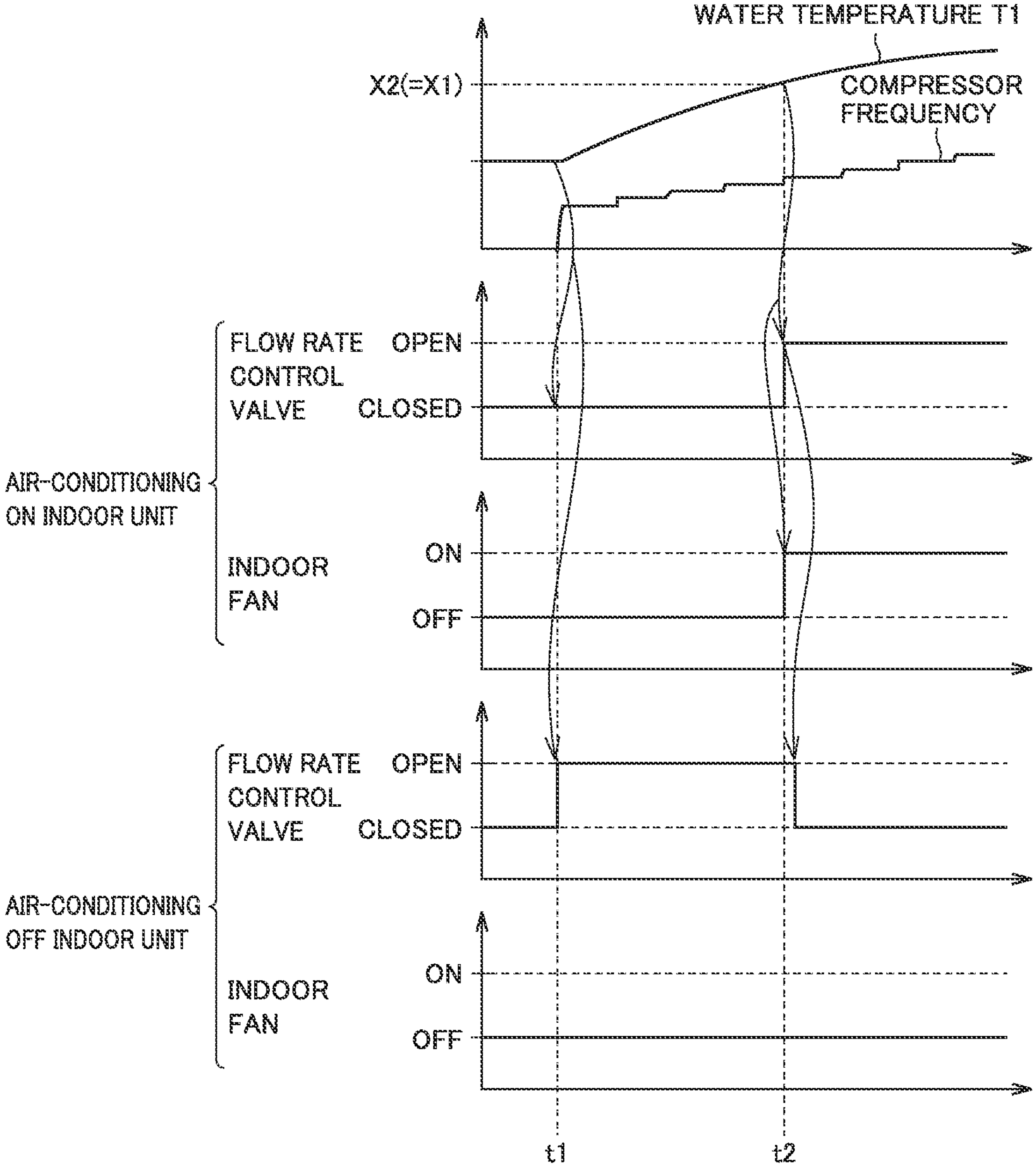
FIG. 10 is a diagram of operation waveforms showing an example of change in water temperature and control of the flow rate control valves at the start of heating operation in the first embodiment.

FIG. 10 is a diagram of operation waveforms showing an example of change in water temperature and control of the flow rate control valves at the start of heating operation in the first embodiment. When the user starts the heating operation with a remote controller or the like at time t1, controller 100 causes compressor 11 to start operating. At this time, when water temperature T1 is lower than determination value X1, controller 100 controls the air-conditioning ON indoor unit to which the request for air conditioning has been made, such that its flow rate control valve is in the closed state, and its indoor fan is in the OFF state. Thus, supply of cold air into the room for which the air conditioning has been requested is suppressed. On the other hand, controller 100 controls the air-conditioning OFF indoor unit to which the request for air conditioning has not been made, such that its flow rate control valve is in the open state, and its indoor fan is in the OFF state. As a result, the air-conditioning OFF indoor unit is utilized as a path for circulating the low-temperature second heat medium.

When water temperature T1 reaches determination value X2 at time t2, controller 100 controls the air-conditioning ON indoor unit to which the request for air conditioning has been made, such that its flow rate control valve is in the open state, and its indoor fan is in the ON state. As a result, supply of hot air is started into the room for which the air conditioning has been requested. For ease of description, FIG. 10 shows an example where determination value X1 and determination value X2 in the flowchart of FIG. 9 are equal.

Then, controller 100 controls the air-conditioning OFF indoor unit to which the request for air conditioning has not been made, such that its flow rate control valve is in the closed state, and its indoor fan is in the OFF state. This prevents the second heat medium having the increased temperature from flowing through the air-conditioning OFF indoor unit, thus allowing the air conditioning to be performed efficiently.

After time t2, the compressor operating frequency is gradually increased, and water temperature T1 increases, until the indoor air temperature reaches a target temperature that is set for each indoor unit. Timings to open and close the flow rate control valves are slightly shifted at time t2 in order to avoid a sudden pressure increase which puts a burden on pump 23 and a pipe passage, as would be the case if all of the flow rate control valves are closed during the operation of pump 23.

While the control for suppressing cold air at the start of heating operation has been described above, this control can also be applied to suppress hot air at the start of cooling operation.

In this case, when air conditioning apparatus 1 is operating in a cooling mode, and the temperature detected by temperature sensor 26 is higher than a third determination value X3, controller 100 opens the flow rate control valve corresponding to a heat exchanger, of the plurality of third heat exchangers 31, 41 and 51, to which the request for air conditioning has not been made, and closes the flow rate control valve corresponding to a heat exchanger, of the plurality of third heat exchangers 31, 41 and 51, to which the request for air conditioning has been made. When air conditioning apparatus 1 is operating in the cooling mode, and the temperature detected by temperature sensor 26 is lower than a fourth determination value X4 lower than or equal to third determination value X3, on the other hand, controller 100 opens the flow rate control valve corresponding to the heat exchanger, of the plurality of third heat exchangers 31, 41 and 51, to which the request for air conditioning has been made, and closes the flow rate control valve corresponding to the heat exchanger, of the plurality of third heat exchangers 31, 41 and 51, to which the request for air conditioning has not been made.

Figure 11:
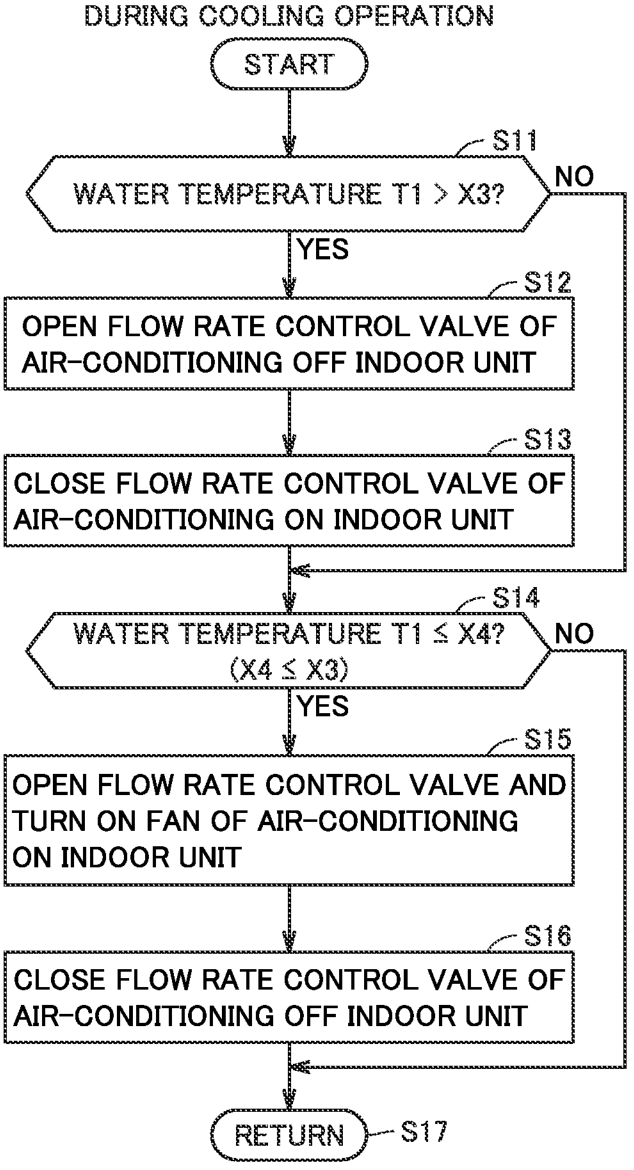
FIG. 11 is a flowchart for illustrating control performed by the controller during cooling operation in the first embodiment.

FIG. 11 is a flowchart for illustrating control performed by the controller during cooling operation in the first embodiment. Processing of the flowchart in FIG. 11 is invoked from a main routine of cooling operation control and repeatedly executed in order to control the flow rate control valves during the cooling operation. The operating frequency of compressor 11, the switching of four-way valve 12, the fans and the like are controlled in the main routine of cooling operation control. As in FIG. 9, temperature T1 of the second heat medium detected by temperature sensor 26 is referred to as water temperature T1 for brevity of description.

Referring to FIG. 11, in step S11, controller 100 determination whether or not water temperature T1 is higher than determination value X3. When water temperature T1 is higher than determination value X3 (YES in S11), controller 100 performs processing of steps S12 and S13, and then moves the processing to step S14. When water temperature T1 is lower than or equal to determination value X3 (NO in S11), on the other hand, controller 100 moves the processing to step S14 without performing the processing of steps S12 and S13.

In step S12, controller 100 opens the flow rate control valve of an indoor unit in the air-conditioning OFF state. In subsequent step S13, controller 100 closes the flow rate control valve of an indoor unit in the air-conditioning ON state. Air conditioning apparatus 1 is then operated in this state, and accordingly, the temperature of the second heat medium decreases while the generation of hot air in the indoor unit in the air-conditioning ON state is suppressed.

In subsequent step S14, controller 100 determines whether or not water temperature T1 is lower than or equal to determination value X4. This determination value X4 may be the same as determination value X3, but is desirably lower than determination value X3 in order to avoid frequent switching of the control of the flow rate control valves.

When water temperature T1 is lower than or equal to determination value X4 (YES in S14), controller 100 performs processing of steps S15 and S16, and then moves the processing to step S17. When water temperature T1 is higher than determination value X4 (NO in S14), on the other hand, controller 100 moves the processing to step S17 without performing the processing of steps S15 and S16.

In step S15, controller 100 opens the flow rate control valve and turns on the fan in the indoor unit in the air-conditioning ON state. As a result, cold air is supplied into the room from the indoor unit to which the request for air conditioning has been made. In subsequent step S16, controller 100 closes the flow rate control valve of the indoor unit in the air-conditioning OFF state. Air conditioning apparatus 1 is then operated in this state, and accordingly, cooling by the indoor unit in the air-conditioning ON state is continued. Then, in step S17, the control is returned to the main routine of cooling operation.

Figure 12:
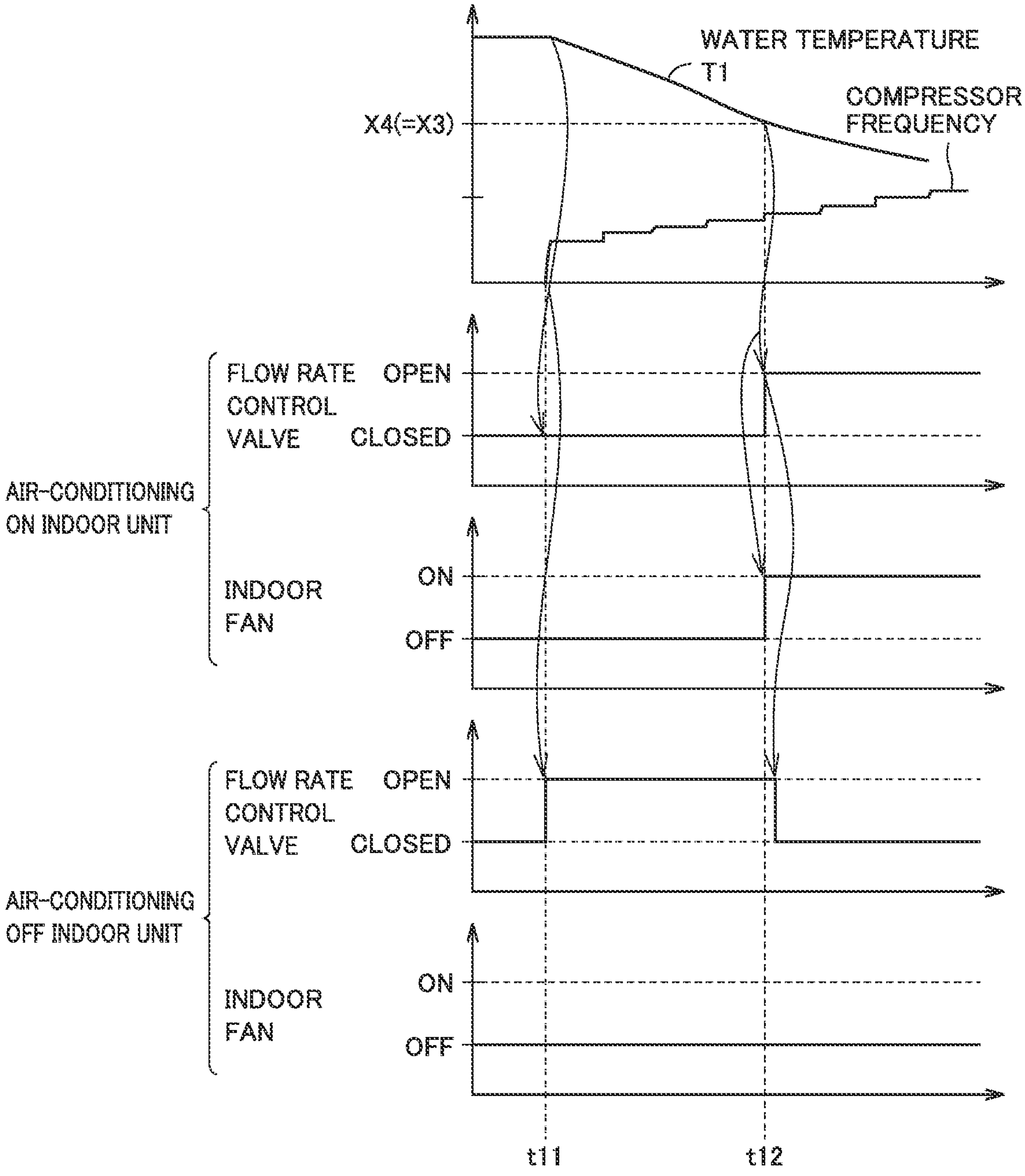
FIG. 12 is a diagram of operation waveforms showing an example of change in water temperature and control of the flow rate control valves at the start of cooling operation in the first embodiment.

FIG. 12 is a diagram of operation waveforms showing an example of change in water temperature and control of the flow rate control valves at the start of cooling operation in the first embodiment. When the user starts the cooling operation with a remote controller or the like at time t11, controller 100 causes compressor 11 to start operating. At this time, when water temperature T1 is higher than determination value X3, controller 100 controls the air-conditioning ON indoor unit to which the request for air conditioning has been made, such that its flow rate control valve is in the closed state, and its indoor fan is in the OFF state. Thus, supply of hot air into the room for which the air conditioning has been requested is suppressed. On the other hand, controller 100 controls the air-conditioning OFF indoor unit to which the request for air conditioning has not been made, such that its flow rate control valve is in the open state, and its indoor fan is in the OFF state. As a result, the air-conditioning OFF indoor unit is utilized as a path for circulating the high-temperature second heat medium.

When water temperature T1 reaches determination value X4 at time t12, controller 100 controls the air-conditioning ON indoor unit to which the request for air conditioning has been made, such that its flow rate control valve is in the open state, and its indoor fan is in the ON state. As a result, supply of cold air is started into the room for which the air conditioning has been requested. For ease of description, FIG. 12 shows an example where determination value X3 and determination value X4 in the flowchart of FIG. 11 are equal. Then, controller 100 controls the air-conditioning OFF indoor unit to which the request for air conditioning has not been made, such that its flow rate control valve is in the closed state, and its indoor fan is in the OFF state. This prevents the cooled second heat medium from flowing through the air-conditioning OFF indoor unit, thus allowing the air conditioning to be performed efficiently.

After time t12, the compressor operating frequency is gradually increased, and water temperature T1 decreases, until the indoor air temperature decreases to a target temperature that is set for each indoor unit. Timings to open and close the flow rate control valves are slightly shifted at time t12 in order to avoid a sudden pressure increase which puts a burden on pump 23 and a pipe passage, as would be the case if all of the flow rate control valves are closed during the operation of pump 23.

As described above, in the first embodiment, when the temperature of the second heat medium is not suitable for air conditioning, the flow rate control valves of the plurality of indoor units are controlled such that the flow path is changed to the indoor unit to which the request for air conditioning has not been made. As a result, supply of air of uncomfortable temperature into the room from the indoor unit is suppressed at the start of air conditioning.

Second Embodiment

In the first embodiment, any one of the indoor units in the air-conditioning OFF state is used as the flow path for the second heat medium. In a second embodiment, an optimal one of the indoor units in the air-conditioning OFF state is selected. For example, when extension pipes 6 and 7 are long and there are a large number of indoor units, it takes time to raise the temperature of the second heat medium to a temperature suitable for heating. It is thus preferable to select a flow path by which the temperature of the second heat medium can be raised in the shortest possible time.

Figure 13:
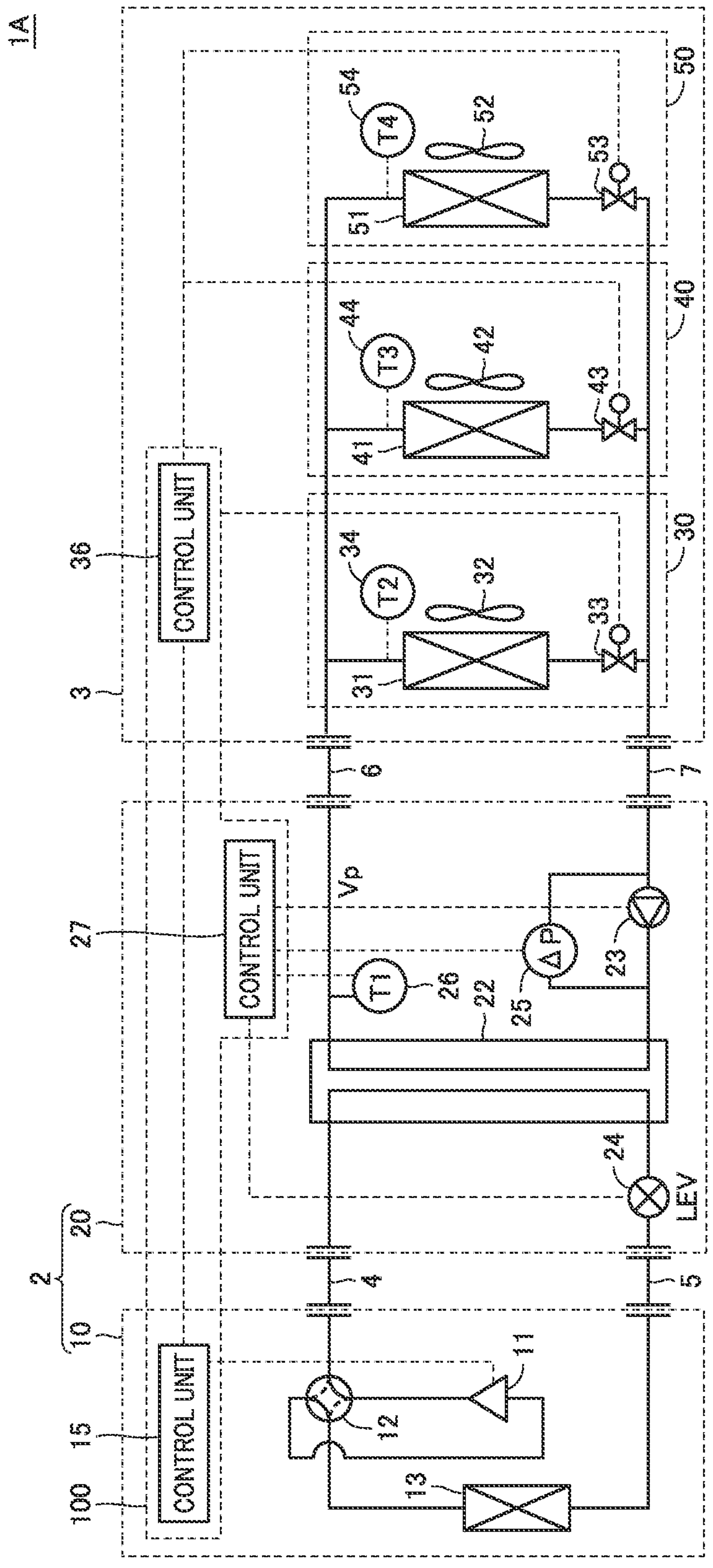
FIG. 13 shows the configuration of an air conditioning apparatus 1A in a second embodiment.

FIG. 13 shows the configuration of an air conditioning apparatus 1A in the second embodiment. In air conditioning apparatus 1A shown in FIG. 13, indoor units 30, 40 and 50 include second temperature sensors 34, 44 and 54, respectively, in addition to the configuration of air conditioning apparatus 1 shown in FIG. 1. The configuration of air conditioning apparatus 1A is otherwise similar to that of air conditioning apparatus 1 shown in FIG. 1, and will not be described repeatedly.

Second temperature sensors 34, 44 and 54 measure temperatures T2, T3 and T4 of the second heat medium flowing into the indoor units, respectively, and output them to controller 100.

When water temperature T1 is lower than determination value X1 at the start of heating operation, controller 100 opens the flow rate control valve, preferentially from an indoor unit located in a shorter circulation path of the indoor units in the air-conditioning OFF state, to quickly raise water temperature T1.

As shown in FIG. 8, controller 100 includes processor 102 and memory 103. In the second embodiment, memory 103 is configured to store an order of the plurality of third heat exchangers. When air conditioning apparatus 1A is performing heating, and temperature T1 detected by temperature sensor 26 is lower than first determination value X1, the processor is configured to open one of the flow rate control valves corresponding to heat exchangers, of the plurality of third heat exchangers 31, 41 and 51, to which the request for air conditioning has not been made, the one of the flow rate control valves having been selected based on the order stored in memory 103.

Air conditioning apparatus 1A further includes the plurality of second temperature sensors 34, 44 and 54 provided for the plurality of third heat exchangers 31, 41 and 51, respectively. When compressor 11 and pump 23 are operated, processor 102 determines an order of preference based on temperature changes that occur in the plurality of second temperature sensors 34, 44 and 54, and causes memory 103 to store the determined order of preference.

Figure 14:
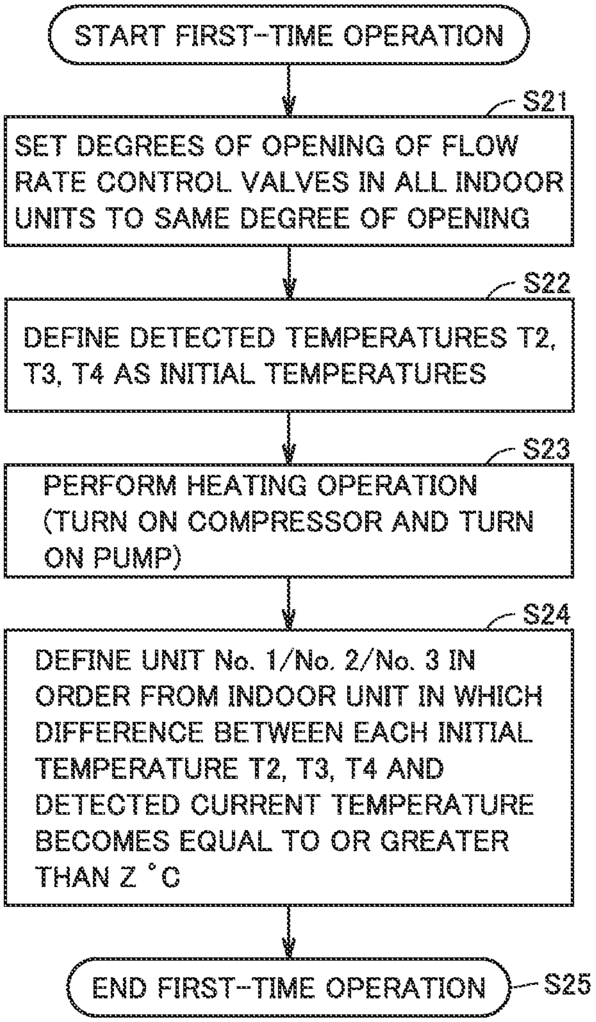
FIG. 14 is a flowchart for illustrating control performed during first-time operation in the second embodiment.

FIG. 14 is a flowchart for illustrating control performed during first-time operation in the second embodiment. Referring to FIGS. 13 and 14, the first-time operation is started when an operation command is entered for the first time after installation. In step S21, controller 100 sets degrees of opening of the flow rate control valves in all of the indoor units to the same degree of opening. Then, in step S22, controller 100 defines temperatures T2, T3 and T4 detected respectively by second temperature sensors 34, 44 and 54 as initial temperatures and stores them in memory 103.

Subsequently, in step S23, controller 100 performs heating operation as the first-time operation by turning on compressor 11 and turning on pump 23. Then, in step S24, controller 100 defines unit numbers of the indoor units as No. 1/No. 2/No. 3 in the order from an indoor unit in which the difference between the above-described initial temperature and the detected current temperature becomes equal to or greater than Z° C., and stores them in the memory. Then, in step S25, controller 100 ends the heating operation.

By performing this first-time operation, the unit numbers are assigned to indoor units 30, 40 and 50 in the order from an indoor unit having a shorter length of the flow path for circulating the second heat medium.

Note that the first-time operation shown in FIG. 14 may be performed as cooling operation instead of the heating operation, since it is only required to set the order of preference of indoor units 30, 40 and 50 in the order from an indoor unit having a shorter length of the flow path for circulating the second heat medium.

Figure 15:
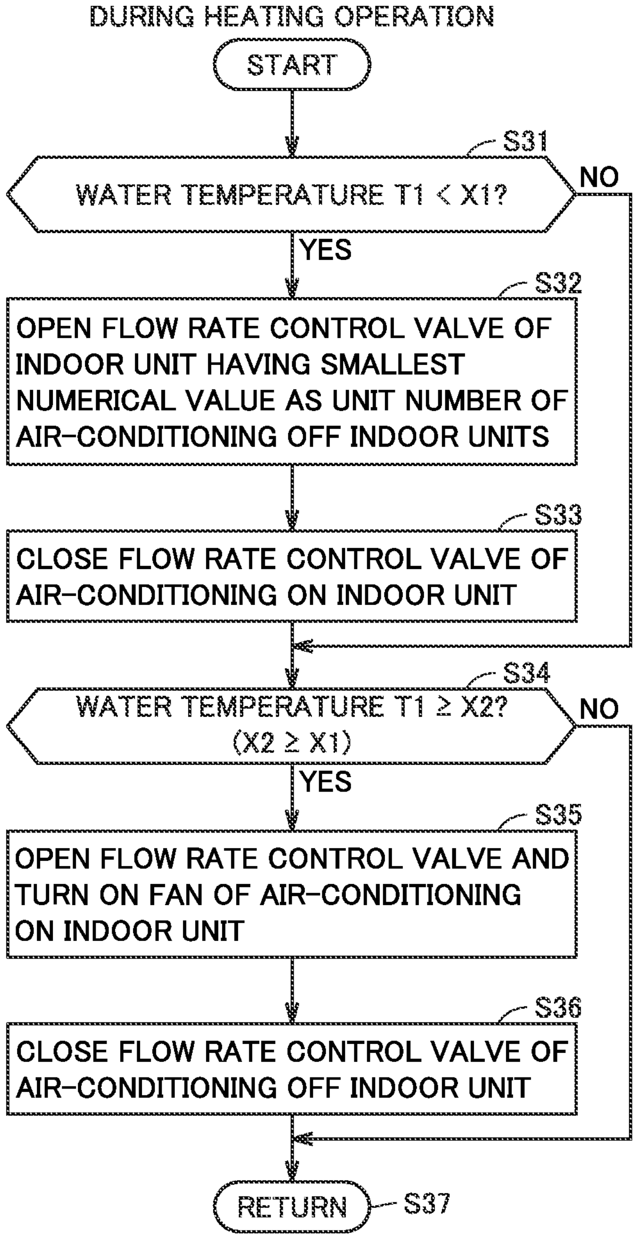
FIG. 15 is a flowchart for illustrating control performed by the controller during heating operation in the second embodiment.

FIG. 15 is a flowchart for illustrating control performed by the controller during heating operation in the second embodiment. Processing of the flowchart in FIG. 15 is invoked from the main routine of heating operation control and repeatedly executed in order to control the flow rate control valves during the heating operation. The operating frequency of compressor 11, the switching of four-way valve 12, the fans and the like are controlled in the main routine of heating operation control. As in FIG. 9 and the like, temperature T1 of the second heat medium detected by temperature sensor 26 is referred to as water temperature T1 for brevity of description.

Referring to FIG. 15, in step S31, controller 100 determines whether or not water temperature T1 is lower than determination value X1. When water temperature T1 is lower than determination value X1 (YES in S31), controller 100 performs processing of steps S32 and S33, and then moves the processing to step S34. When water temperature T1 is higher than or equal to determination value X1 (NO in S31), on the other hand, controller 100 moves the processing to step S34 without performing the processing of steps S32 and S33.

In step S32, controller 100 selects an indoor unit having the smallest numerical value as the unit number from the indoor units in the air-conditioning OFF state, and opens its flow rate control valve. As a result, the flow of the second heat medium through air conditioning apparatus 1A is changed to pass through the shortest one of the paths using the indoor units in the air-conditioning OFF state.

In subsequent step S33, controller 100 closes the flow rate control valve of an indoor unit in the air-conditioning ON state. This prevents the second heat medium flowing through air conditioning apparatus 1A from flowing through the indoor unit in the air-conditioning ON state. Air conditioning apparatus 1A is then operated in this state, and accordingly, the temperature of the second heat medium increases while the generation of cold air in the indoor unit in the air-conditioning ON state is suppressed.

In subsequent step S34, controller 100 determines whether or not water temperature T1 is higher than or equal to determination value X2. This determination value X2 may be the same as determination value X1, but is desirably higher than determination value X1 in order to avoid frequent switching of the control of the flow rate control valves.

When water temperature T1 is higher than or equal to determination value X2 (YES in S34), controller 100 performs processing of steps S35 and S36, and then moves the processing to step S37. When water temperature T1 is lower than determination value X2 (NO in S34), on the other hand, controller 100 moves the processing to step S37 without performing the processing of steps S35 and S36.

In step S35, controller 100 opens the flow rate control valve and turns on the fan in the indoor unit in the air-conditioning ON state. As a result, hot air is supplied into the room from the indoor unit to which the request for air conditioning has been made. The flow of the second heat medium through air conditioning apparatus 1A is changed to pass through the indoor unit in the air-conditioning ON state.

In subsequent step S36, controller 100 closes the flow rate control valve of the one of the indoor units in the air-conditioning OFF state that was selected as the flow path. As a result, the flow of the second heat medium through air conditioning apparatus 1A is changed to not pass through the indoor unit in the air-conditioning OFF state. Air conditioning apparatus 1A is then operated in this state, and accordingly, heating by the indoor unit in the air-conditioning ON state is continued. Then, in step S37, the control is returned to the main routine of heating operation.

The control of the flow rate control valves can also be applied to cooling operation in the second embodiment as well.

Figure 16:
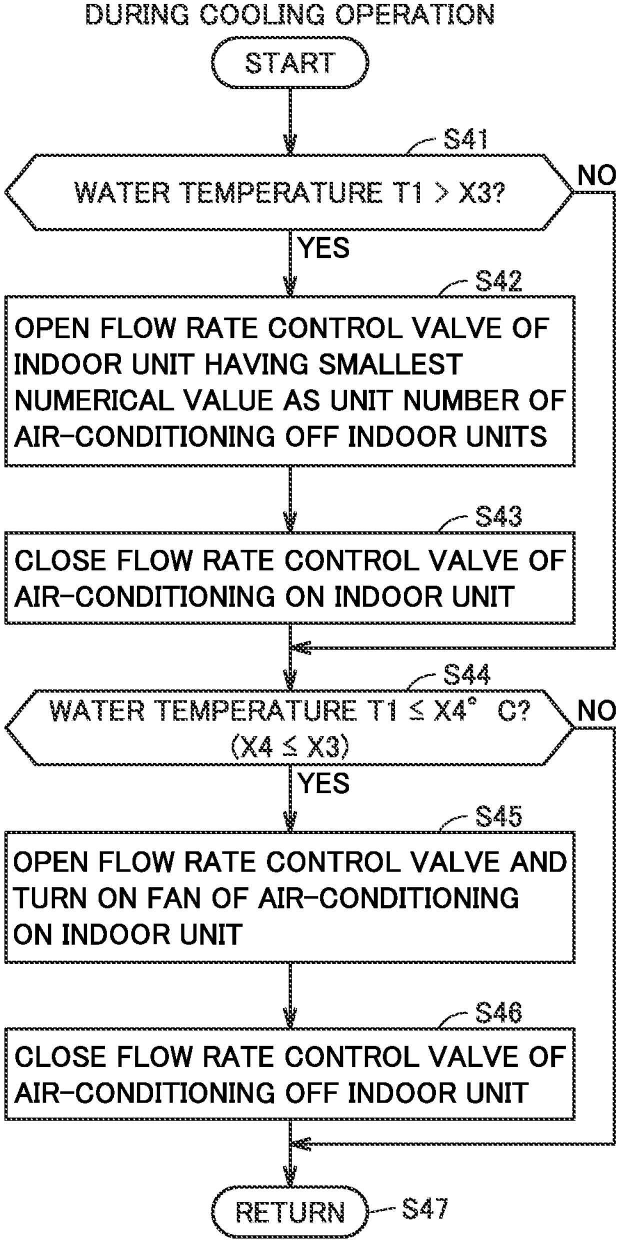
FIG. 16 is a flowchart for illustrating control performed by the controller during cooling operation in the second embodiment.

FIG. 16 is a flowchart for illustrating control performed by the controller during cooling operation in the second embodiment. Processing of the flowchart in FIG. 16 is invoked from the main routine of cooling operation control and repeatedly executed in order to control the flow rate control valves during the cooling operation. The operating frequency of compressor 11, the switching of four-way valve 12, the fans and the like are controlled in the main routine of cooling operation control. As in FIG. 9 and the like, temperature T1 of the second heat medium detected by temperature sensor 26 is referred to as water temperature T1 for brevity of description.

Referring to FIG. 16, in step S41, controller 100 determines whether or not water temperature T1 is higher than determination value X3. When water temperature T1 is higher than determination value X3 (YES in S41), controller 100 performs processing of steps S42 and S43, and then moves the processing to step S44. When water temperature T1 is lower than or equal to determination value X1 (NO in S41), on the other hand, controller 100 moves the processing to step S44 without performing the processing of steps S42 and S43.

In step S42, controller 100 selects an indoor unit having the smallest numerical value as the unit number from the indoor units in the air-conditioning OFF state, and opens its flow rate control valve. As a result, the flow of the second heat medium through air conditioning apparatus 1A is changed to pass through the shortest one of the paths using the indoor units in the air-conditioning OFF state.

In subsequent step S43, controller 100 closes the flow rate control valve of an indoor unit in the air-conditioning ON state. This prevents the second heat medium flowing through air conditioning apparatus 1A from flowing through the indoor unit in the air-conditioning ON state. Air conditioning apparatus 1A is then operated in this state, and accordingly, the temperature of the second heat medium decreases while the generation of hot air in the indoor unit in the air-conditioning ON state is suppressed.

In subsequent step S44, controller 100 determines whether or not water temperature T1 is lower than or equal to determination value X4. This determination value X4 may be the same as determination value X3, but is desirably lower than determination value X3 in order to avoid frequent switching of the control of the flow rate control valves.

When water temperature T1 is lower than or equal to determination value X4 (YES in S44), controller 100 performs processing of steps S45 and S46, and then moves the processing to step S47. When water temperature T1 is higher than determination value X4 (NO in S44), on the other hand, controller 100 moves the processing to step S47 without performing the processing of steps S45 and S46.

In step S45, controller 100 opens the flow rate control valve and turns on the fan in the indoor unit in the air-conditioning ON state. As a result, cold air is supplied into the room from the indoor unit to which the request for air conditioning has been made. The flow of the second heat medium through air conditioning apparatus 1A is changed to pass through the indoor unit in the air-conditioning ON state.

In subsequent step S46, controller 100 closes the flow rate control valve of the one of the indoor units in the air-conditioning OFF state that was selected as the flow path. As a result, the flow of the second heat medium through air conditioning apparatus 1A is changed to not pass through the indoor unit in the air-conditioning OFF state. Air conditioning apparatus 1A is then operated in this state, and accordingly, cooling by the indoor unit in the air-conditioning ON state is continued. Then, in step S47, the control is returned to the main routine of cooling operation.

As described above, in the second embodiment, the path for circulating the second heat medium is shortened as much as possible, so that the time required for the temperature of the second heat medium to reach a temperature suitable for air conditioning can be minimized.

Third Embodiment

In the first and second embodiments, an indoor unit in the air-conditioning OFF state is used to circulate the second heat medium until the second heat medium reaches a temperature suitable for air conditioning at the start of heating or cooling. However, there may be no indoor unit in the air-conditioning OFF state.

In a third embodiment, the control described in the first or second embodiment is performed when there is an indoor unit in the air-conditioning OFF state, and one of indoor units in the air-conditioning ON state is selected to circulate the second heat medium when there is no indoor unit in the air-conditioning OFF state.

Figure 17:
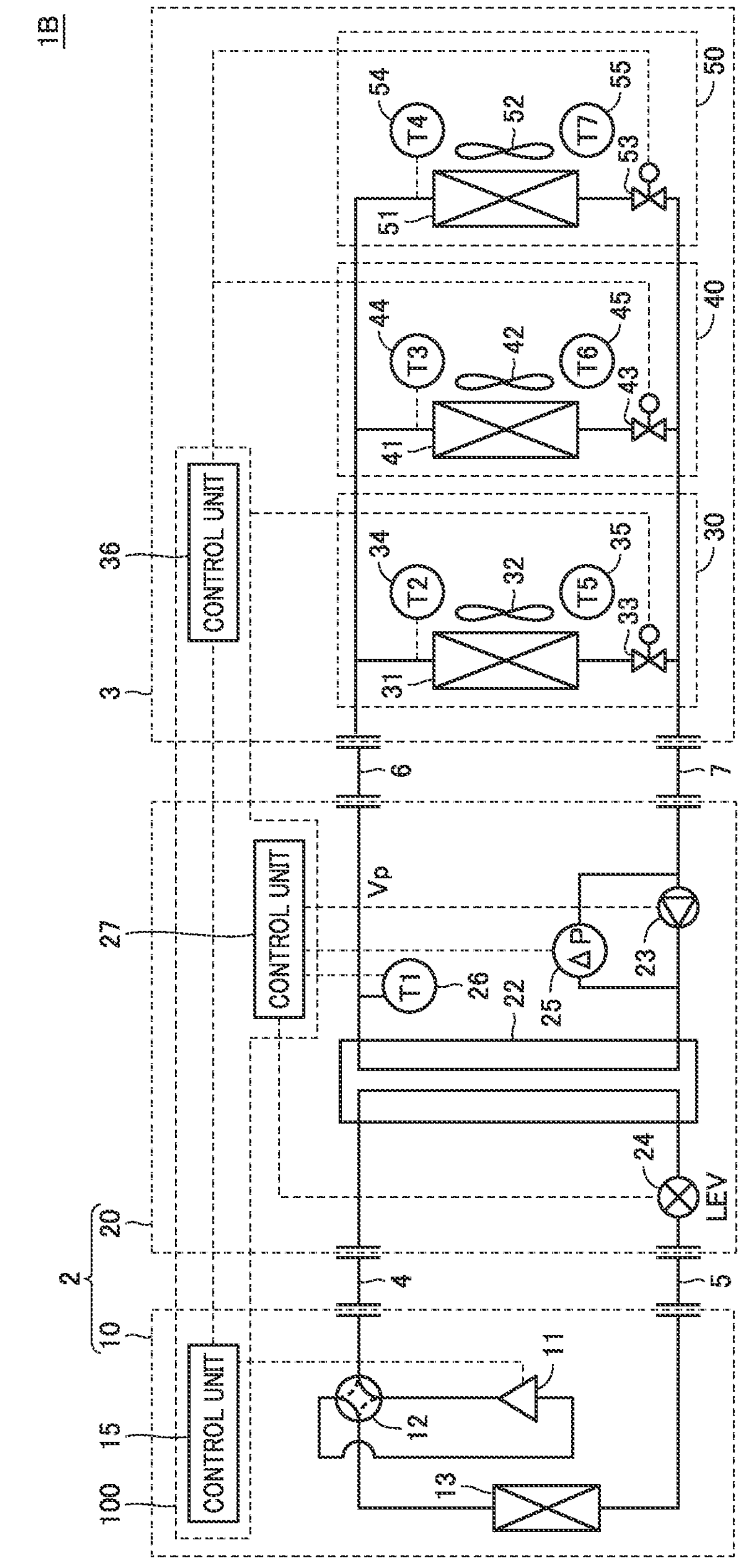
FIG. 17 shows the configuration of an air conditioning apparatus 1B in a third embodiment.

FIG. 17 shows the configuration of an air conditioning apparatus 1B in the third embodiment. In air conditioning apparatus 1B shown in FIG. 17, indoor units 30, 40 and 50 include third temperature sensors 35, 45 and 55 for sensing room temperatures, respectively, in addition to the configuration of air conditioning apparatus 1A shown in FIG. 13. The configuration of air conditioning apparatus 1B is otherwise similar to that of air conditioning apparatus 1A shown in FIG. 13, and will not be described repeatedly.

Third temperature sensors 35, 45 and 55 measure temperatures T5, T6 and T7 of rooms in which indoor units 30, 40 and 50 are installed, and output them to controller 100.

Air conditioning apparatus 1B according to the third embodiment includes the plurality of third temperature sensors 35, 45 and 55 for detecting temperatures T5, T6 and T7 of the rooms that correspond to the plurality of third heat exchangers 31, 41 and 51, respectively.

When air conditioning apparatus 1B is performing heating, temperature T1 detected by temperature sensor 26 is lower than first determination value X1, and a request for air conditioning has been made to all of the plurality of third heat exchangers 31, 41 and 51, controller 100 performs the following control. That is, controller 100 selects at least one of the plurality of third heat exchangers 31, 41 and 51 based on an order of the plurality of third heat exchangers 31, 41 and 51, opens the flow rate control valve corresponding to the selected heat exchanger, and closes the flow rate control valve(s) corresponding to a non-selected heat exchanger(s). This order is determined based on the difference between a set temperature and the room temperature in each of the plurality of third heat exchangers 31, 41 and 51.

Figure 18:
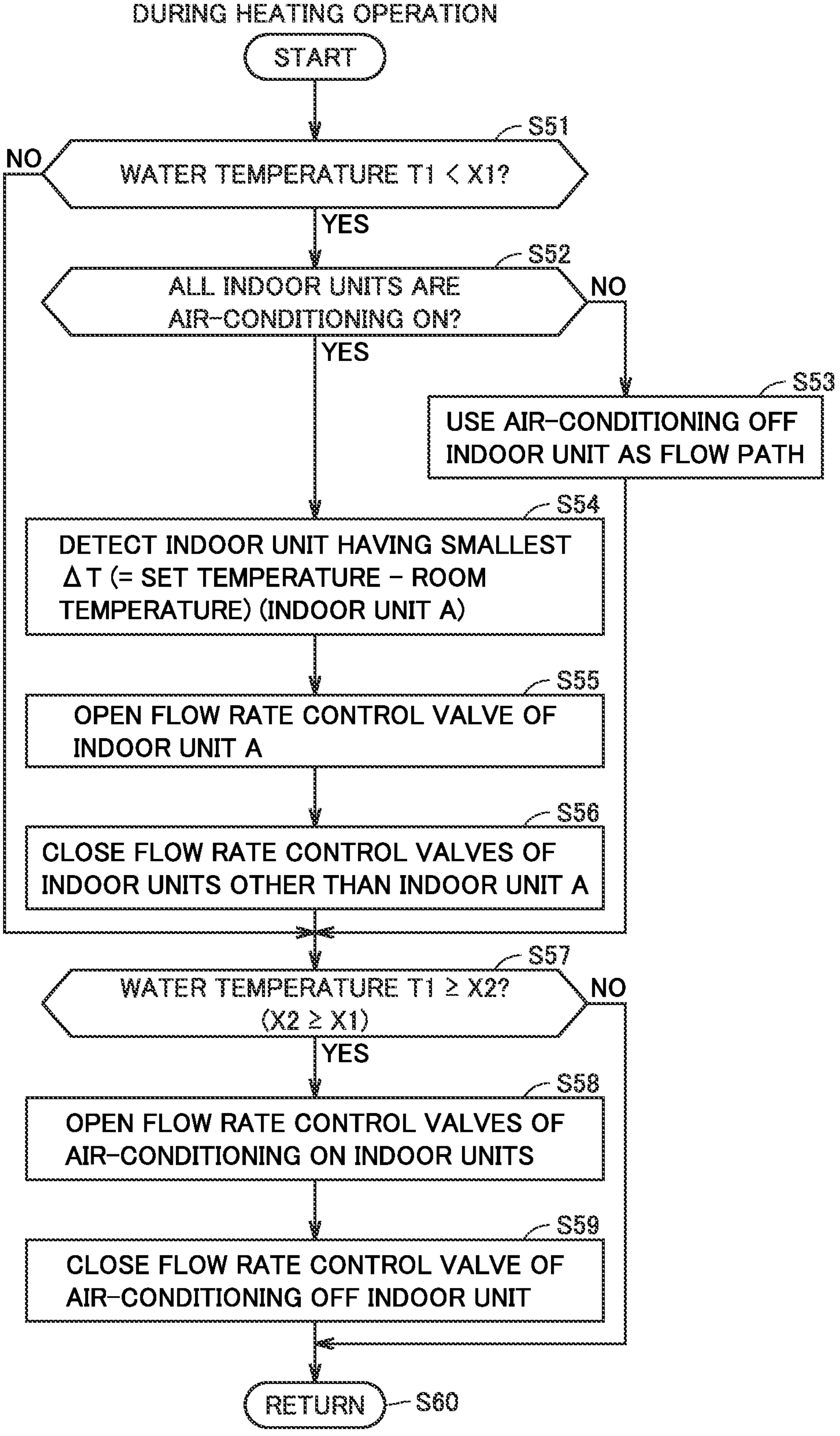
FIG. 18 is a flowchart for illustrating control performed by the controller during heating operation in the third embodiment.

FIG. 18 is a flowchart for illustrating control performed by the controller during heating operation in the third embodiment. Processing of the flowchart in FIG. 18 is invoked from the main routine of heating operation control and repeatedly executed in order to control the flow rate control valves during the heating operation. The operating frequency of compressor 11, the switching of four-way valve 12, the fans and the like are controlled in the main routine of heating operation control. As in FIG. 9 and the like, temperature T1 of the second heat medium detected by temperature sensor 26 is referred to as water temperature T1 for brevity of description.

Referring to FIG. 18, in step S51, controller 100 determines whether or not water temperature T1 is lower than determination value X1. When water temperature T1 is lower than determination value X1 (YES in S51), controller 100 performs processing of step S52, and then moves the processing to step S57. When water temperature T1 is higher than or equal to determination value X1 (NO in S51), on the other hand, controller 100 moves the processing to step S57 without performing the processing of step S52.

In step S52, controller 100 determines whether or not all of the indoor units are in the air-conditioning ON state. When there is an indoor unit in the air-conditioning OFF state in S52 (NO in S52), controller 100 uses the indoor unit in the air-conditioning OFF state as a flow path to circulate the second heat medium, as was described in the first or second embodiment. When there is no indoor unit in the air-conditioning OFF state in S52 (YES in S52), on the other hand, controller 100 successively performs processing of steps S54, S55 and S56.

In step S54, controller 100 detects an indoor unit having the smallest difference ΔT between the set temperature and the room temperature in each indoor unit. This detected indoor unit will be referred to as indoor unit A.

Subsequently, in step S55, controller 100 opens the flow rate control valve of indoor unit A. Then, in step S56, controller 100 closes the flow rate control valves of the indoor units other than indoor unit A. In this state, the second heat medium circulates through an indoor unit in which the set temperature is closest to the room temperature, thus causing less discomfort for the user than when the second heat medium circulates through the other indoor units.

Then, in step S57, controller 100 determines whether or not water temperature T1 is higher than or equal to determination value X2° C. When water temperature T1 is higher than or equal to determination value X2 (YES in S57), controller 100 performs processing of steps S58 and S59, and then moves the processing to step S60. When water temperature T1 is lower than determination value X2 (NO in S57), on the other hand, controller 100 moves the processing to step S60 without performing the processing of steps S58 and S59.

In step S58, controller 100 opens the flow rate control valves of the indoor units in the air-conditioning ON state, and turns on the fans of those indoor units. Then, in step S59, controller 100 closes the flow rate control valve of the indoor unit in the air-conditioning OFF state. As a result, normal heating operation is performed.

In step S60, controller 100 returns the control to the main routine of heating operation control.

The control of the flow rate control valves can also be applied to cooling operation in the third embodiment as well.

Figure 19:
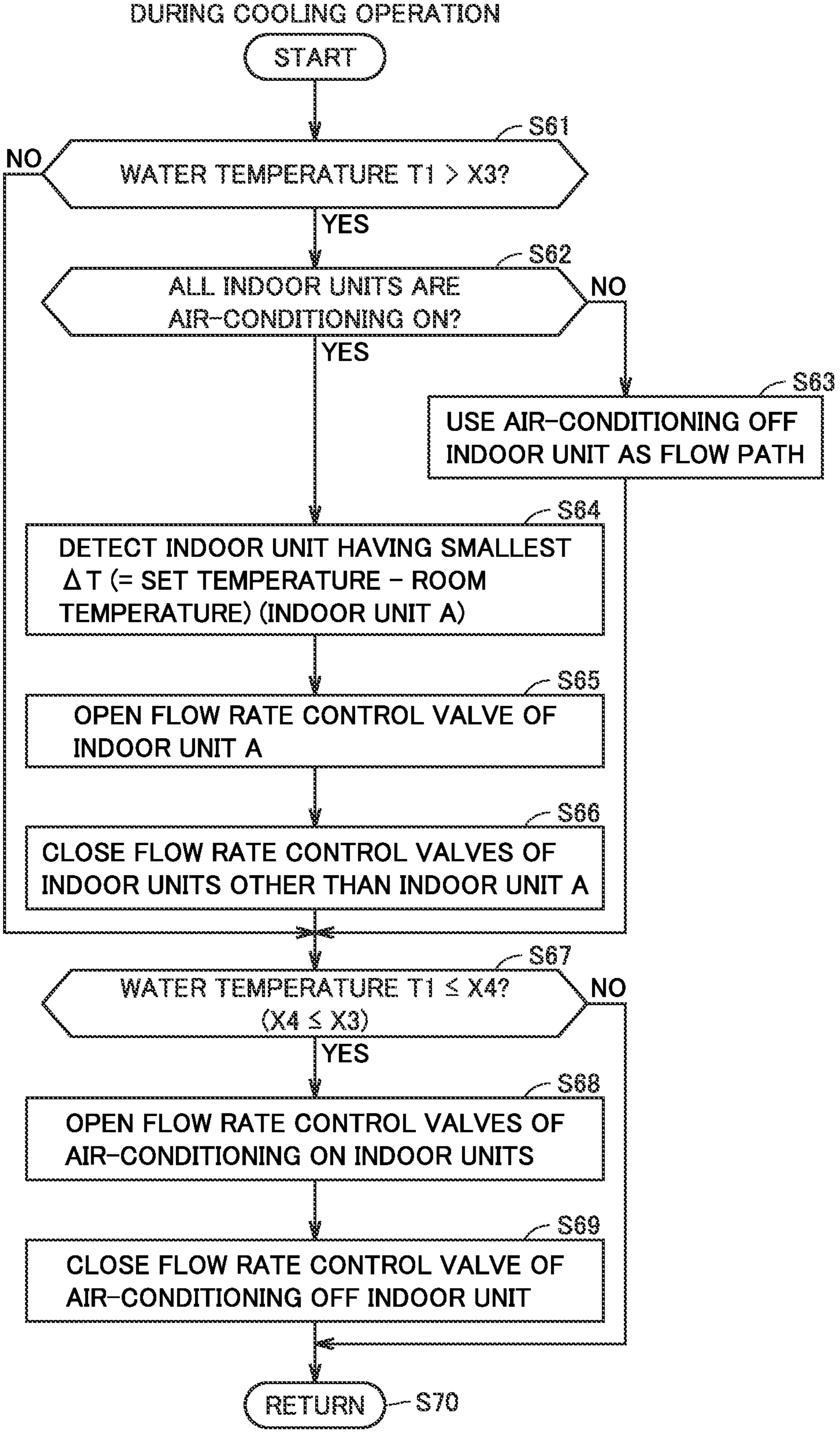
FIG. 19 is a flowchart for illustrating control performed by the controller during cooling operation in the third embodiment.

FIG. 19 is a flowchart for illustrating control performed by the controller during cooling operation in the third embodiment. Processing of the flowchart in FIG. 19 is invoked from the main routine of cooling operation control and repeatedly executed in order to control the flow rate control valves during the cooling operation. The operating frequency of compressor 11, the switching of four-way valve 12, the fans and the like are controlled in the main routine of cooling operation control. As in FIG. 9 and the like, temperature T1 of the second heat medium detected by temperature sensor 26 is referred to as water temperature T1 for brevity of description.

Referring to FIG. 19, in step S61, controller 100 determines whether or not water temperature T1 is higher than determination value X3. When water temperature T1 is higher than determination value X3 (YES in S61), controller 100 performs processing of step S62, and then moves the processing to step S67. When water temperature T1 is lower than or equal to determination value X3 (NO in S61), on the other hand, controller 100 moves the processing to step S67 without performing the processing of step S62.

In step S62, controller 100 determines whether or not all of the indoor units are in the air-conditioning ON state. When there is an indoor unit in the air-conditioning OFF state in S62 (NO in S62), controller 100 uses the indoor unit in the air-conditioning OFF state as a flow path to circulate the second heat medium, as was described in the first or second embodiment. When there is no indoor unit in the air-conditioning OFF state in S62 (YES in S62), on the other hand, controller 100 successively performs processing of steps S64, S65 and S66.

In step S64, controller 100 detects an indoor unit having the smallest difference ΔT between the set temperature and the room temperature in each indoor unit. This detected indoor unit will be referred to as indoor unit A.

Subsequently, in step S65, controller 100 opens the flow rate control valve of indoor unit A. Then, in step S66, controller 100 closes the flow rate control valves of the indoor units other than indoor unit A. In this state, the second heat medium circulates through an indoor unit in which the set temperature is closest to the room temperature, thus causing less discomfort for the user than when the second heat medium circulates through the other indoor units.

Then, in step S67, controller 100 determines whether or not water temperature T1 is lower than or equal to determination value X4° C. When water temperature T1 is lower than or equal to determination value X4° C. (YES in S67), controller 100 performs processing of steps S68 and S69, and then moves the processing to step S70. When water temperature T1 is higher than determination value X4 (NO in S67), on the other hand, controller 100 moves the processing to step S70 without performing the processing of steps S68 and S69.

In step S68, controller 100 opens the flow rate control valves of the indoor units in the air-conditioning ON state, and turns on the fans of those indoor units. Then, in step S69, controller 100 closes the flow rate control valve of the indoor unit in the air-conditioning OFF state. As a result, normal cooling operation is performed.

In step S70, controller 100 returns the control to the main routine of cooling operation control.

As described above, in the third embodiment, the temperatures of the rooms in which the respective indoor units are installed are measured by third temperature sensors 35, 45 and 55, and it is determined whether or not the room temperatures are close to the set temperatures. Then, the indoor unit in a room in which the set temperature is closest to the room temperature is used as a flow path for the second heat medium at startup, thus causing less discomfort for the user than when the other indoor units are used as the flow path.

Modification of Embodiments

While determination value X1, which is a determination temperature to be compared with water temperature T1, is a fixed value (for example, 25° C.) in the embodiments above, it may be set variably.

The temperature sensors for measuring room temperatures, each corresponding to one of the plurality of indoor units, are provided as shown in FIG. 17. During heating operation, controller 100 sets determination value X1 based on the room temperature of an indoor unit in the air-conditioning ON state. Controller 100 calculates determination value X1 in accordance with the following equation (1):

$$X1(°\ C.)=RT(°\ C.)+\alpha(°\ C.) \quad (I)$$

where RT represents the room temperature, X1 represents the determination value, and a represents a constant within the range of from 2° C. to 5° C.

Determination value X1 thus calculated may be applied to the first to third embodiments. Note that when there are a plurality of indoor units in the air-conditioning ON state, the lowest one of the room temperatures of the indoor units in the air-conditioning ON state may be applied as RT to the equation (1).

Determination value X3 during the cooling operation may also be set variably in a similar manner.

During the cooling operation, controller 100 sets determination value X3 based on the room temperature of the indoor unit in the air-conditioning ON state. Controller 100 calculates determination value X3 in accordance with the following equation (2):

$$X3(°\ C.)=RT(°\ C.)-\alpha(°\ C.) \quad (2)$$

where RT represents the room temperature, X3 represents the determination value, and α represents a constant within the range of from 2° C. to 5° C.

Determination value X3 thus calculated may be applied to the first to third embodiments. Note that when there are a plurality of indoor units in the air-conditioning ON state, the highest one of the room temperatures of the indoor units in the air-conditioning ON state may be applied as RT to the equation (2).

By setting the determination value variably in this manner, discomfort for the user can be prevented until the second heat medium has a temperature suitable for performing effective air conditioning with respect to the room temperature of each indoor unit.

It should be understood that the embodiments disclosed herein are illustrative and non-restrictive in every respect. The scope of the present disclosure is defined by the terms of the claims, rather than the description of the embodiments above, and is intended to include any modifications within the meaning and scope equivalent to the terms of the claims.

REFERENCE SIGNS LIST

1, 1A, 1B air conditioning apparatus; 2 heat source unit; 3 indoor air conditioning device; 4, 5 pipe; 6,7 extension pipe; 10 outdoor unit; 11 compressor; 12 four-way valve; 13 first heat exchanger; 15, 27, 36 control unit; 20 relay unit; 22 second heat exchanger; 23 pump; 24 expansion valve; 25 pressure sensor; 26 temperature sensor; 30, 40, 50 indoor unit; 31, 41, 51 third heat exchanger; 32, 42, 52 fan; 33, 43, 53 flow rate control valve; 34, 44, 54 second temperature sensor; 35, 45, 55 third temperature sensor; 100 controller; 101 reception device; 102, 202 processor; 103 memory; 200 remote controller; 201 input device; 203 transmission device.

The invention claimed is:

1. A controller to control an air conditioning apparatus, the air conditioning apparatus having a compressor configured to compress a first heat medium, a first heat exchanger configured to exchange heat between the first heat medium and outdoor air, a second heat exchanger configured to exchange heat between the first heat medium and a second heat medium, a plurality of third heat exchangers each configured to exchange heat between the second heat medium and indoor air, a plurality of flow rate control valves each configured to control a flow rate of the second heat medium flowing through a corresponding one of the plurality of third heat exchangers, a pump configured to circulate the second heat medium between the plurality of third heat exchangers and the second heat exchanger, and a first temperature sensor configured to detect a temperature of the second heat medium, the controller configured:

when the air conditioning apparatus is operating in a heating mode, (i) when the temperature detected by the first temperature sensor is lower than a first determination value, to open the flow rate control valve corresponding to a heat exchanger, of the plurality of third heat exchangers, to which a request for air conditioning has not been made, and to close the flow rate control valve corresponding to a heat exchanger, of the plurality of third heat exchangers, to which the request for air conditioning has been made, and (ii) when the temperature detected by the first temperature sensor is higher than a second determination value higher than or equal to the first determination value, to open the flow rate control valve corresponding to the heat exchanger, of the plurality of third heat exchangers, to which the request for air conditioning has been made, and to close the flow rate control valve corresponding to the heat exchanger, of the plurality of third heat exchangers, to which the request for air conditioning has not been made.

2. The controller to control the air conditioning apparatus according to claim 1, the controller is further configured: when the air conditioning apparatus is operating in a cooling mode, (i) when the temperature detected by the first temperature sensor is higher than a third determination value, to open the flow rate control valve corresponding to a heat exchanger, of the plurality of third heat exchangers, to which the request for air conditioning has not been made, and to close the flow rate control valve corresponding to a heat exchanger, of the plurality of third heat exchangers, to which the request for air conditioning has been made, and (ii) when the temperature detected by the first temperature sensor is lower than a fourth determination value lower than or equal to the third determination value, to open the flow rate control valve corresponding to the heat exchanger, of the plurality of third heat exchangers, to which the request for air conditioning has been made, and to close the flow rate control valve corresponding to the heat exchanger, of the plurality of third heat exchangers, to which the request for air conditioning has not been made.

3. The controller to control the air conditioning apparatus according to claim 1, wherein the controller includes a memory configured to store an order of the plurality of third heat exchangers, and a processor configured, when the air conditioning apparatus is performing heating, and the temperature detected by the first temperature sensor is lower than the first determination value, to open one of the flow rate control valves corresponding to heat exchangers, of the plurality of third heat exchangers, to which the request for air conditioning has not been made, the one of the flow rate control valves having been selected based on the order stored in the memory.

4. The controller to control the air conditioning apparatus according to claim 3, the air conditioning apparatus further having a plurality of second temperature sensors, each provided for a corresponding one of the plurality of third heat exchangers, wherein the controller is further configured: when the compressor and the pump are operated, to determine the order based on temperature changes that occur in the plurality of second temperature sensors, and to cause the memory to store the determined order.

5. The controller to control the air conditioning apparatus according to claim 1, the air conditioning apparatus having a plurality of third temperature sensors, each configured to detect a temperature of a room corresponding to one of the plurality of third heat exchangers, wherein the controller is further configured: when the air conditioning apparatus is performing heating, and the temperature detected by the first temperature sensor is lower than the first determination value, and the request for air conditioning has been made to all of the plurality of third heat exchangers, to select at least one of the plurality of third heat exchangers based on an order of the plurality of third heat exchangers, to open the flow rate control valve corresponding to the selected heat exchanger, and to close the flow rate control valve corresponding to a non-selected heat exchanger, and the order is determined based on a difference between a set temperature and the temperature of the room in each of the plurality of third heat exchangers.

6. The controller to control the air conditioning apparatus, according to claim 1, wherein the air conditioning apparatus further comprises: an outdoor unit including the compressor and the first heat exchanger.

7. The controller to control the air conditioning apparatus, according to claim 1, wherein the air conditioning apparatus further comprises: a relay unit including the second heat exchanger, and the pump.

8. The controller to control the air conditioning apparatus, according to claim 1, wherein the air conditioning apparatus further comprises: a heat source unit including the compressor, the first heat exchanger, the second heat exchanger, and the pump.

9. The controller to control the air conditioning apparatus, according to claim 1, wherein the air conditioning apparatus further comprises: a first heat medium circuit formed by the compressor, the first heat exchanger, and the second heat exchanger; and a second heat medium circuit formed by the pump, the second heat exchanger, and the plurality of third heat exchangers.

* * * * *